United States Patent
Klose et al.

(10) Patent No.: US 11,981,770 B2
(45) Date of Patent: May 14, 2024

(54) FORMALDEHYDE SCAVENGER FOR BINDER SYSTEMS

(71) Applicant: HÜTTENES-ALBERTUS Chemische Werke Gesellschaft mit beschränkter Haftung, Düsseldorf (DE)

(72) Inventors: Annika Klose, Hannover (DE); Daniel Winkelhaus, Hannover (DE)

(73) Assignee: HÜTTENES-ALBERTUS Chemische Werke Gesellschaft mit beschränkter Haftung, Düsseldorf (DE)

( * ) Notice: Subject to any disclaimer, the term of this patent is extended or adjusted under 35 U.S.C. 154(b) by 125 days.

(21) Appl. No.: 17/436,718

(22) PCT Filed: Mar. 9, 2020

(86) PCT No.: PCT/EP2020/056210
§ 371 (c)(1),
(2) Date: Sep. 7, 2021

(87) PCT Pub. No.: WO2020/182724
PCT Pub. Date: Sep. 17, 2020

(65) Prior Publication Data
US 2022/0169780 A1  Jun. 2, 2022

(30) Foreign Application Priority Data
Mar. 8, 2019 (DE) .................. 102019106021.4

(51) Int. Cl.
*B32B 3/10* (2006.01)
*C08G 18/08* (2006.01)
*C08G 18/54* (2006.01)
*C08G 18/76* (2006.01)
*C08J 7/04* (2020.01)
*C08K 5/17* (2006.01)
*C08K 5/21* (2006.01)

(52) U.S. Cl.
CPC ....... *C08G 18/542* (2013.01); *C08G 18/0852* (2013.01); *C08G 18/7671* (2013.01); *C08J 7/04* (2013.01); *C08K 5/175* (2013.01); *C08K 5/21* (2013.01); *C08J 2375/04* (2013.01)

(58) Field of Classification Search
None
See application file for complete search history.

(56) References Cited

U.S. PATENT DOCUMENTS

| | | | |
|---|---|---|---|
| 4,197,219 A | 4/1980 | Damico | |
| 6,291,578 B1 | 9/2001 | Rosthauser | |
| 6,465,542 B1 | 10/2002 | Torbus | |
| 10,011,677 B2 | 5/2018 | Yamashita | |
| 2004/0082473 A1 | 4/2004 | Beilfuss | |
| 2004/0132864 A1 | 7/2004 | Shibahara | |
| 2007/0135608 A1 | 6/2007 | Hannig | |
| 2011/0269902 A1 | 11/2011 | Strunk | |
| 2011/0315911 A1 | 12/2011 | Lanver | |
| 2012/0126092 A1 | 5/2012 | Jattke | |
| 2013/0225718 A1 | 8/2013 | Ladegourdie | |
| 2013/0232884 A1* | 9/2013 | Tumler | B24D 3/285 523/303 |
| 2013/0248138 A1 | 9/2013 | Cornelissen | |
| 2018/0126449 A1* | 5/2018 | Vargas | C08L 61/06 |
| 2019/0091758 A1 | 3/2019 | Ladégourdie | |
| 2019/0283116 A1 | 9/2019 | Díaz | |
| 2019/0359759 A1 | 11/2019 | Priebe | |
| 2020/0316674 A1 | 10/2020 | Priebe | |
| 2021/0162489 A1 | 6/2021 | Ladégourdie | |

FOREIGN PATENT DOCUMENTS

| | | |
|---|---|---|
| CN | 101524737 | 9/2009 |
| DE | 2349598 | 9/1974 |
| DE | 102012200967 | 7/2013 |
| EP | 0054294 | 6/1982 |
| EP | 3333205 | 6/2018 |
| FR | 1222949 | 6/1960 |
| JP | 2008-183580 | 8/2008 |
| JP | 2011-168686 | 9/2011 |
| WO | 2013133131 | 9/2013 |

OTHER PUBLICATIONS

Excerpt of textbook, "Phenolic Resins: A Century of Progress," Editor: Louis Pilato, Publisher: Springer, 2010, Chapter 18, Section: 18.5.3, p. 477.
VDG—Leaflet R 305, "Urethane cold-box process—Handling of input material, gases and vapors as well as residual materials," Feb. 1998, with English Translation of section 3.1.1.
Excerpt of Kunststoff-Handbuch [Plastics handbook], vol. 7 "Polyurethane" [Polyurethanes] (Carl Hanser Verlag Munich Vienna 1993), with English translation of section 2.1.2.2.
Excerpt of textbook "Synthetic Methods in Step-Growth Polymers," (Editors: Martin E. Rogers and Timothy Long, Publisher: John Wiley & Sons, Inc., 2003, Chapter 4.

\* cited by examiner

*Primary Examiner* — Christopher M Polley
(74) *Attorney, Agent, or Firm* — DUANE MORRIS LLP; Gregory M. Lefkowitz; Brandon A. Chan

(57) ABSTRACT

A description is given of a binder system, intended more particularly for use in a process from the group consisting of polyurethane cold-box processes and polyurethane no-bake processes.

10 Claims, No Drawings

FORMALDEHYDE SCAVENGER FOR BINDER SYSTEMS

CROSS-REFERENCE TO RELATED APPLICATIONS

This application is a § 371 national stage entry of International Application No. PCT/EP2020/056210, filed on Mar. 9, 2020, which claims priority to German Patent Application No. 102019106021.4, filed on Mar. 8, 2019, the entire contents of which are incorporated herein by reference.

The present invention relates to a binder system, intended more particularly for use in a process from the group consisting of polyurethane cold-box processes and polyurethane no-bake processes; to a molding material mixture comprising this binder system; to a process in which a binder system of the invention is used; and to articles from the group consisting of foundry molds and foundry cores. The present invention further relates to the use of substances selected from the group consisting of amino acids and urea for producing a binder system of the invention and, respectively, a molding material mixture of the invention, and also to the use of a binder system of the invention or a molding material mixture of the invention for producing articles from the group consisting of foundry molds, foundry cores and feeders.

In the production of feeders, foundry molds and foundry cores, the molding material base is frequently bound using binder systems that undergo cold curing to form polyurethane. These binder systems comprise two components: a polyol (normally in solution in a solvent) having at least two OH groups in the molecule (polyol component), and a polyisocyanate (in solution in a solvent or solvent-free) having at least two isocyanate groups in the molecule (polyisocyanate component). The polyol component is usually a phenolic resin in solution in a solvent. The polyol component is therefore referred to hereinafter as phenolic resin component. The two binder components that are added to and mixed with a molding material base to produce a molding material mixture react in the molded molding material mixture in a polyaddition reaction to give a polyurethane binder. The binder system here is cured in the presence of basic catalysts, preferably in the form of tertiary amines, which are introduced into the mold with a carrier gas after the molding material mixture has been molded (polyurethane cold-box process), or which are added as a solution before the molding material mixture is molded (polyurethane no-bake process). Binder systems of these kinds are described for example in patent applications WO 2017/153474 A1 and WO 2016/165916 A1.

When processing phenol-formaldehyde resins, formaldehyde emission is not entirely avoidable. These emissions accompanying the processing of phenol-formaldehyde resins, and also vaporization and outgassing of formaldehyde from feeders, foundry cores and foundry molds produced in the polyurethane cold-box or polyurethane no-bake process, constitute a considerable workplace contamination which usually cannot be sufficiently captured by protective measures such as fume hoods or the like.

The release of formaldehyde from such feeders, foundry cores and foundry molds is promoted in particular by elevated temperature. It is true that the binder system is cured without supply of heat in the polyurethane cold-box process and in the polyurethane no-bake process. However, the conditions prevailing when feeders, foundry cores and foundry molds are used in metal casting are always such that there is emission of formaldehyde.

DE 102 44 442 A1 discloses a preservative with reduced formaldehyde emission that comprises at least one formal and at least one emission-diminishing additive selected from components including urea and amino acids, for the purpose, for example, of preserving cooling lubricants, fuels, varnishes, dispersions or water-based paint/ink. DE 102 44 442 A1 relates to a technical field which is very far removed from that of the present application.

DE 23 49 598 B discloses a binder based on phenol-formaldehyde condensation products, optionally with additions of resoles and modifier, and with a content of curing agents, for use in hot-curing molding compositions, more particularly in foundry molding compositions according to the mask molding process, characterized in that the phenol-formaldehyde condensation product has an additional content of amino carboxylic acids. The amino acid is added during the preparation of the phenol-formaldehyde condensation product itself, and so the amino acid is incorporated in "condensed-in" form, in other words into the phenol-formaldehyde condensation product. During the production of feeders, foundry cores and foundry molds, therefore, the amino acid is no longer available (or is only available in a relatively small amount) as a formaldehyde scavenger. The purpose of adding amino acids to the binder according to DE 23 49 598 B is to improve the water-solubility of the binders. Reducing formaldehyde emissions has no part to play in the disclosure of DE 23 49 598 B.

In certain cases, the production of feeders, foundry cores and foundry molds comprises steps downstream of the curing of the binder system, in which moldings produced in the polyurethane cold-box process or in the polyurethane no-bake process are exposed to an elevated temperature.

In the casting of iron and steel, in particular, preference is given to using foundry molds and foundry cores whose surface has regions in which a coating comprising particles of one or more refractories is disposed. This coating forms a surface of the mold or of the core that comes into contact with a metal melt during casting. A coating of this kind is commonly referred to as a refractory coating or coating on the basis of a refractory coating. This coating acts as a boundary layer and/or barrier layer with respect to the cast metal, and is used for the purposes including the suppression of mechanisms of casting defect formation at the interface between metal and core or mold, and/or the controlled utilization of metallurgical effects. Generally speaking, refractory coatings in foundry technology are intended to fulfill the following functions in particular that are known to the skilled person:

improving the smoothness of the casting surface and/or;
preventing chemical reactions between constituents of the molding material mixture and the metal melt, and so facilitating separation between mold/core and casting, and/or
preventing surface defects on the casting, such as gas bubbles, penetrations, veining and/or scabs.

Ready-to-use compositions (commonly referred to in the art as refractory coating compositions) for producing coatings for foundry molds and foundry cores are usually suspensions of fine-grain, refractory to highly refractory inorganic materials (refractories) in a carrier liquid (e.g., water, alkanols, or mixtures of water and one or more alkanols), often with further constituents in solution or suspension in the carrier liquid. For producing a foundry mold or a foundry core, the refractory coating composition is applied to the corresponding surface regions of a molding, and then the carrier liquid is removed by thermal treatment, to form a coating. The carrier liquid is commonly removed at a temperature above 40° C., preferably in the range from 50° C. to 200° C. At these temperatures, moldings that have been produced from a molding material mixture comprising a binder system that cures to form a polyurethane emit significant amounts of formaldehyde. Such emissions constitute a considerable workplace contamination.

Causes of the formaldehyde emissions the invention is intended to reduce include in particular the following two sources:
- molecular formaldehyde (i.e. formaldehyde not bound in the phenolic resin) which is entrained into the molding material mixture with the phenolic resin component (i)
- formaldehyde which is released on thermal exposure of feeders, foundry cores and foundry molds, as a result of at least partial decomposition of the binder (polyurethane formed from the phenolic resin of the phenolic resin component (i) and from the polyisocyanate of the polyisocyanate component (ii)).

The present invention provides ways and means of reducing the emissions of formaldehyde from both sources.

The object of the present invention is to reduce the emissions of formaldehyde which are released in particular (but not only) on thermal exposure from feeders, foundry cores and foundry molds that have been produced from a molding material mixture having a binder system comprising a phenolic resin component and a polyisocyanate component.

This object is achieved, according to a first aspect of the invention, by a binder system, intended more particularly for use in a process from the group consisting of the polyurethane cold-box process and the polyurethane no-bake process, where the binder system comprises:
(i) a phenolic resin component comprising
 a) one or more phenolic resins
 b) a solvent where based on the total mass of the phenolic resin component (i), the concentration of the phenolic resins a) is 40% to 60%, preferably 45% to 60%, more preferably 48% to 55%;
(ii) a polyisocyanate component comprising
 c) one or more isocyanates having at least two isocyanate groups per molecule
 d) optionally a solvent
 where based on the total mass of the polyisocyanate component (ii), the concentration of the isocyanates c) is 60% to 100%; preferably 70% to 98%, more preferably 75% to 95%;
(iii) a further component comprising
 e) one or more substances selected from the group consisting of amino acids and urea,
 where components (i), (ii) and (iii) are spatially separate from one another.

The binder system of the invention preferably consists of
(i) a phenolic resin component as defined above (more particularly in one of the preferred embodiments described below) and
(ii) a polyisocyanate component separate therefrom and as defined above (more particularly in one of the preferred embodiments described below), and
(iii) a further component comprising
 e) one or more substances selected from the group consisting of amino acids and urea as defined above.

The binder system of the invention more preferably comprises or consists of
(i) a phenolic resin component as defined above and
(ii) a polyisocyanate component separate therefrom and as defined above, and (iii) a further component comprising or consisting of glycine.

In the binder system of the invention, the stoichiometric ratio of isocyanate groups in the polyisocyanate component (ii) to hydroxyl groups in the phenolic resin component (i) is preferably in the range from 0.5 to 1.5, further preferably in the range from 0.6 to 1.4, more preferably in the range from 0.7 to 1.3, particularly preferably in the range from 0.8 to 1.2, very particularly preferably in the range from 0.9 to 1.1, especially preferably in the range from 0.95 to 1.05. While it is preferable in many cases that the stoichiometric ratio of isocyanate groups in the polyisocyanate component (ii) to hydroxyl groups in the phenolic resin component (i) is close to 1, there are also cases in which it is advantageous that there is an excess of isocyanate groups relative to the hydroxyl groups, and also cases in which it is advantageous that there is an excess of hydroxyl groups relative to isocyanate groups.

In the binder system of the invention, the phenolic resin component (i), the polyisocyanate component (ii) and the further component (iii) are separate from one another, meaning that they are in separate containers. The addition reaction (polyurethane formation) between the phenolic resin of the phenolic resin component (i) and the polyisocyanate of the polyisocyanate component (ii) is not to occur until the two components (i) and (ii) have been mixed in a molding material mixture with a molding material base and optionally further constituents of the molding material mixture to be produced, and this molding material mixture has been molded.

Through reactions with formaldehyde, substances e) selected from the group consisting of amino acids and urea are capable of binding molecular formaldehyde with formation of nonvolatile reaction products; that is, they act as formaldehyde scavengers. The structures of resultant reaction products are known to the person skilled in the art. In the reaction of substances e) selected from the group consisting of amino acids and urea, the amino groups of the amino acids/urea undergo methylolation. In the case of urea, this reaction proceeds as follows:

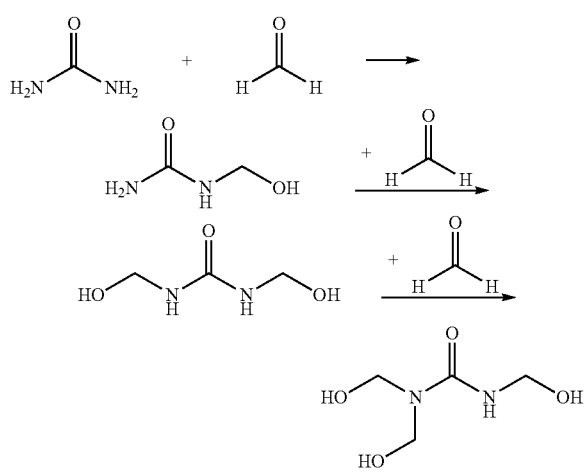

In the case of urea as substance e), particularly on exposure to heat, a chain extension is possible through condensation reaction with formation of methylene groups:

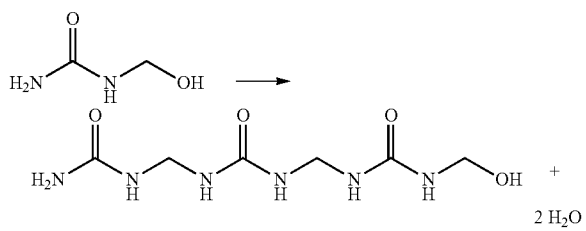

+ 2 H₂O

The products formed in this case may enter into further condensation reactions, thus forming long-chain, possibly crosslinked, resinous products having structures similar to formaldehyde-urea resins.

Without being tied to any particular theory, it is presently assumed that in accordance with the present invention, in the reaction of one or more substances e) from the group consisting of amino acids and urea with formaldehyde, reaction products are formed which contain no phenol rings, as the substances e) from the group consisting of amino acids and urea encounter the phenolic resin component (i) of the binder system of the invention only on production of a molding material mixture. At this point in time, in the phenolic resin component (i) of the binder of the invention, the condensation reaction between phenol and formaldehyde has already been concluded. This is a key difference relative to the procedure in DE 23 49 598 B, since in this case amino acids are added during the preparation of the phenol-formaldehyde condensation product (phenolic resin) itself, and so are incorporated (by being "condensed in") into the phenol-formaldehyde condensation product.

As there is no formaldehyde in component (iii) of the binder system of the invention, the aforementioned reaction of the substances e) selected from the group consisting of amino acids and urea with formaldehyde takes place only when the substances e) selected from the group consisting of amino acids and urea that are present in component (iii) of the binder system of the invention come into contact with molecular formaldehyde. This is the case, for example, when in the production of a molding material mixture, component (iii) of the binder system of the invention is combined with a phenolic resin component (i) containing a significant concentration of molecular formaldehyde (for details see below), or when a molding produced from such a molding material mixture is subject to thermal exposure. Surprisingly it has emerged that substances e) selected from the group consisting of amino acids and urea are capable very effectively of reducing the formaldehyde emissions. In other words, the reaction between the substance e) in solid form and the gaseous formaldehyde is surprisingly very efficient.

It is true that in certain cases the invention prefers to produce moldings by using a binder system whose phenolic resin component (i) has a very low concentration of molecular formaldehyde (for details see below), and to cure the binder system without supply of heat, by a process from the group consisting of the polyurethane cold-box process and the polyurethane no-bake process (for details see below). However, even moldings produced accordingly have a tendency to release formaldehyde over the course of time, especially under thermal exposure. This formaldehyde is bound by reaction with substances selected from the group consisting of amino acids and urea that are present, in accordance with the invention, in component (iii) of the binder system, to form nonvolatile reaction products, and so the emission of formaldehyde is diminished.

The amino acids e) are preferably selected from the group consisting of alanine, glycine, isoleucine, methionine, proline, valine, histidine, phenylalanine, tryptophan, tyrosine, asparagine, glutamine, cysteine, methionine, serine, threonine, tyrosine, lysine, arginine and histidine, more preferably from the group consisting of the group consisting of glycine, glutamine, alanine, valine and serine. Glycine is especially preferred.

The total concentration of the substances e) selected from the group consisting of amino acids and urea in component (iii) is preferably 0.1% to 10%, preferably 10% to 80%, more preferably 15% to 60%, based in each case on the total mass of component (iii).

In a first embodiment, preferred in the invention, component (iii) of the binder system of the invention consists of one or more substances e) selected from the group consisting of amino acids and urea.

In a second embodiment, component (iii) of the binder system of the invention comprises not only one or more substances e) selected from the group consisting of amino acids and urea but also one or more further constituents which are in solid form at 25° C. and 101.325 kPa. For example, component (iii) comprises not only e) one or more substances selected from the group consisting of amino acids and urea, preferably glycine f) but also one or more further constituents from the group consisting of iron oxide, starch, corn cob granules, wood flour, molding material bases (e.g., quartz), graphite, magnesium oxide and spodumene.

In this second embodiment, therefore, component (iii) of the binder system of the invention is a mixture comprising the above-stated constituents e) and f), or consisting of the above-stated constituents e) and f).

The further constituents f) of component (iii) of the binder system of the invention are usefully selected from customary constituents of molding material mixtures (such as molding material bases, for example) and constituents of customary additive mixtures for molding material mixtures, such as customary additive mixtures for preventing casting defects. Additive mixtures of these kinds are known in the to the person skilled in the art.

For example, component (iii) of the binder system of the invention is a mixture comprising or consisting of e) one or more substances selected from the group consisting of amino acids and urea, preferably glycine f) one or more constituents present in the molding material mixture to be produced, such as a molding material base.

The addition of the substances e) selected from the group consisting of amino acids and urea as a constituent of a mixture with one or more further constituents f), which are also present in the molding material mixture to be produced, such as molding material bases, for example, makes it easier to meter and incorporate component (iii) by mixing when the molding material mixture is produced. Regarding suitable molding material bases, reference may be made to the observations in the context of the second aspect of the invention.

For example, component (iii) of the binder system of the invention is a mixture comprising or consisting of e) one or more substances selected from the group consisting of amino acids and urea, preferably glycine f) one or more constituents of customary additive mixtures for molding material mixtures, selected from the group consisting of iron oxide, starch, corn cob granules, wood flour, graphite, magnesium oxide, quartz and spodumene.

The addition of the substances e) selected from the group consisting of amino acids and urea as a constituent of a mixture with constituents of customary additive mixtures for molding material mixtures makes it easier to meter and incorporate component (iii) by mixing during the production of the molding material mixture, and reduces the number of components to be combined with one another when producing the molding material mixture.

The fraction of constituents present in solid form at 25° C. and 101.325 kPa, including e) the substances selected from the group consisting of amino acids and urea, is preferably 50% to 100%, more preferably 75% to 100%, very preferably 85% to 100%, based on the total mass of component (iii). Component (iii) preferably comprises a solid or a homogeneous solids mixture, more particularly in powder form or in granular form. In order to prevent dusting, it is preferable in certain cases for component (iii) to include small fractions of constituents which are present in liquid form at 25° C. and 101.325 kPa, as well. For example, the solid constituents of component (iii) may be mixed with a liquid composition corresponding to the composition of the phenolic resin component (i) of the binder systems. The fraction of constituents of component (iii) that are present in liquid form at 25° C. and 101.325 kPa is preferably 20% or less, more preferably 10% or less, very preferably 5% or less, or even 1% or less, based on the total mass of component (iii).

Phenolic resin components (i) for binder systems, intended more particularly for use in a process from the group consisting of polyurethane cold-box processes and polyurethane no-bake processes, are known in the prior art.

Phenolic resins a) are condensation products of one or more phenol monomers of the general formula (II)

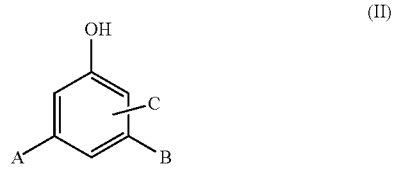

with one or more aldehydes of the general formula R'CHO in which R' is a hydrogen atom or an alkyl group having 1 to 8 carbon atoms. In formula (II), A, B and C independently of one another are selected from the group consisting of hydrogen, unsaturated aliphatic groups having not more than 16 carbon atoms, and saturated aliphatic groups having not more than 16 carbon atoms. The aliphatic groups here are preferably alkyl groups, more preferably from the group consisting of methyl, ethyl, n-propyl, isopropyl, n-butyl, isobutyl, tert-butyl, octyl and nonyl, or alkenyl groups, more preferably from the group consisting of pentadecenyl, pentadecadienyl and pentadecatrienyl. Preferred phenol monomers of the formula (II) are those in which at least one of the substituents A, B and C, preferably two of the substituents A, B and C or all of substituents A, B and C are hydrogen.

Phenol monomers that are suitable for the preparation of phenolic resins and that fall within the formula (II) are, for example, phenol (hydroxybenzene $C_6H_5OH$), alkylphenols such as o-cresol, m-cresol, p-cresol, p-butylphenol, p-octylphenol, p-nonylphenol, and also cardanol (designation for compounds of the formula (II), where A and C are hydrogen and B is an aliphatic, unbranched alkyl or alkenyl group having 15 carbon atoms and 0, 1, 2 or 3 double bonds).

Phenol (hydroxybenzene $C_6H_5OH$), o-cresol, cardanol and mixtures thereof are preferred phenol monomers for the preparation of phenolic resins. A preferred aldehyde for the preparation of phenolic resins is formaldehyde, which may also be used in the form of paraformaldehyde. Formaldehyde is used either as the sole aldehyde or in combination with one or more further aldehydes.

The phenolic resin component (i) of the binder system of the invention preferably comprises a phenolic resin a) in the form of an ortho-fused resole. "Ortho-fused resole" refers to a phenolic resin whose molecules have
aromatic rings formed from phenol monomers and linked by methylene ether bridges in the ortho, ortho' position and terminal methylol groups arranged in the ortho position; the terminal methylol groups may be etherified.

The term "ortho" or "ortho'" refers to the ortho position or the ortho' position, respectively, in relation to the hydroxyl group of the phenol. It is not impossible here that, in the molecules of the ortho-fused resoles for preferred used in the invention, there are also aromatic rings linked by methylene groups (as well as the aromatic rings linked by methylene ether bridges). Nor is it impossible that, in the molecules of the ortho-fused resoles for preferred use in the invention, there are also terminal hydrogen atoms or terminal methyl groups (when o-cresol is used as an additional reactant; see below) in the ortho position (as well as terminal methylol groups in the ortho position). In these cases, in the molecules of the ortho-fused resoles for preferred use in the invention, the ratio of methylene ether bridges to methylene bridges is 1:1 or greater, and the ratio of terminal methylol groups in ortho position to terminal hydrogen atoms and/or terminal methyl groups in ortho position is likewise 1:1 or greater. Phenolic resins of these kinds are also referred to as benzyl ether resins. The structure of such ortho-fused resole is represented by the general formula (III):

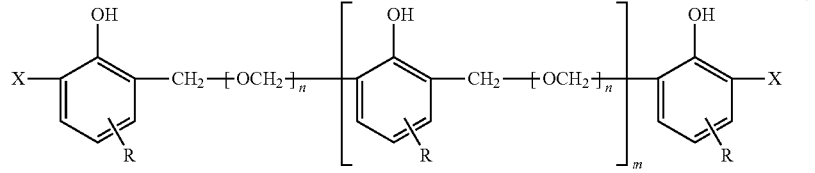

In formula (III)
X is selected from the group consisting of hydrogen, the methyl group $CH_3$, the methylol group $CH_2OH$ and etherified methylol groups, where preferably at least one of the groups X is a methylol group $CH_2OH$ or an etherified methylol group,
R is hydrogen or a substituent in meta or para position to the phenolic hydroxyl group, preferably from the group consisting of methyl, n-butyl, isobutyl, tert-butyl, octyl, nonyl, pentadecenyl, pentadecadienyl and pentadecatrienyl, m is 1 or an integer >1, preferably an integer from 1 to 10, n for each of the m+1 groups (IIIa)

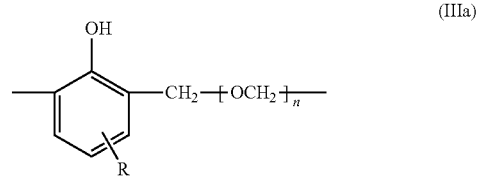

is selected independently from 0 and 1, where the number of groups (IIIa) with n=1 is greater than the number of groups (IIIa) with n=0, or the number of groups (IIIa) with n=1 is equal to the number of groups (IIIa) with n=0.

or an aralkyl radical having 7 to 9 carbon atoms, or a furfuryl radical, or a group having a structure of formula (IV)

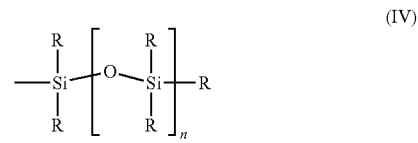

where, in formula (IV), n is an integer from 0 to 20, preferably from 0 to 4, and each R independently of the other Rs is selected from the group consisting of hydroxyl groups, alkoxy groups having one to 6 carbon atoms (preferably ethoxy, propoxy or butoxy groups), and groups having a resole structure of formula (IIIb)

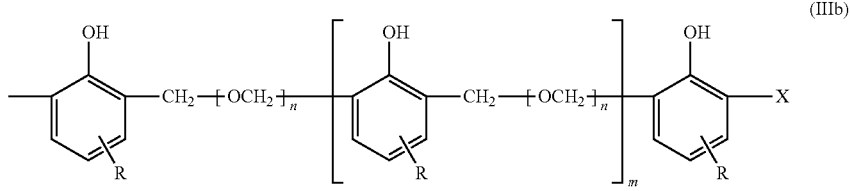

According to the customary understanding of a person skilled in the art, the term "ortho-fused resole" or "ortho-fused phenolic resole" (alternatively: ortho-condensed phenolic resole) embraces compounds as disclosed in the text book "Phenolic Resins: A century of progress" (editor: L. Pilato, publisher: Springer, year of publication: 2010) particularly on page 477 by figure 18.22. The term also embraces the "benzyl ether resins (ortho-phenol resoles)" specified in VDG datasheet R 305 "Urethane cold-box process" (February 1998) under 3.1.1. The term, moreover, embraces the "phenolic resins of the benzyl ether resin type" disclosed in EP 1 057 554 B1; cf., in particular, paragraphs [0004] to [0006] therein.

Ortho-fused resoles are obtainable by polycondensation of phenol monomers with hydrogen in the ortho position and in the ortho' position in relation to the hydroxyl group with a molar excess of formaldehyde. In addition to phenol monomers with hydrogen in the ortho position and in the ortho' position in relation to the hydroxyl group, o-cresol may be used as further phenol monomer. Preference is given to reacting formaldehyde and phenol monomers in a molar ratio of greater than 1:1 to 2:1, preferably 1.2:1 to 1.5:1, in the liquid phase, typically at a temperature below 130° C., catalyzed by divalent metal ions (preferably $Zn^{2+}$) in a weakly acidic medium. The preparation of ortho-fused resoles or benzyl ether resins is known in the prior art; cf. EP 1 057 554 B1 among others.

The phenolic resin a) is preferably an ortho-fused resole containing terminal unetherified methylol groups —$CH_2OH$ and/or terminal etherified methylol groups —$CH_2OZ$, in which Z is a linear or branched alkyl radical having 1 to 12 carbon atoms, where, in formula (IIIb), X is hydrogen or a methyl group or a methylol group $CH_2OH$, R is hydrogen or a substituent in meta or para position to the phenolic hydroxyl group, preferably from the group consisting of methyl, n-butyl, isobutyl, tert-butyl, octyl, nonyl, pentadecenyl, pentadecadienyl and pentadecatrienyl, m is 1 or an integer >1, preferably an integer from 1 to 10, n for each of the m+1 groups (IIIa)

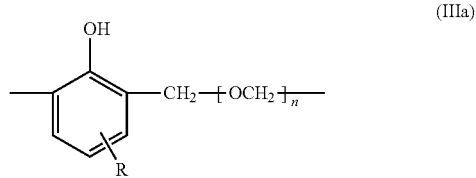

is selected independently from 0 and 1, where the number of groups (IIIa) with n=1 is greater than the number of groups (IIIa) with n=0, or the number of groups (IIIa) with n=1 is equal to the number of groups (IIIa) with n=0.

Preferably, in formula (IV), only one or none of the radicals R has a resole structure of formula (IIIb) as described above.

In an etherified terminal methylol group as described above, the hydrogen atom bonded to the oxygen atom in the unetherified terminal methylol group —$CH_2OH$ is replaced by a radical Z.

In this case, in a first preferred alternative (as indicated above), Z is a linear or branched alkyl radical having 1 to 12 carbon atoms, i.e., the groups —CH$_2$OZ are alkoxymethylene groups. Preferred here are alkyl radicals having 1 to 9 carbon atoms, preferably from the group consisting of methyl, ethyl, n-propyl, isopropyl, n-butyl, isobutyl, tert-butyl and ethylhexyl. Resins of these kinds are preparable by reacting the hydroxyl groups of the unetherified terminal methylol groups —CH$_2$OH of an ortho-fused resole with primary, secondary or tertiary alkanols, examples being methanol, ethanol, n-propanol, isopropanol, n-butanol, isobutanol, tert-butanol and ethylhexyl alcohol.

In a second preferred alternative (as indicated above), Z is a linear or branched arylalkyl radical (alkyl radical substituted by aryl groups) having 5 to 9 carbon atoms, or a furfuryl radical. Preferred radicals R here are benzyl and furfuryl. Resins of these kinds are preparable by reacting the hydroxyl groups of the unetherified terminal methylol groups —CH$_2$OH of an ortho-fused resole with furfuryl alcohol or an aralkyl alcohol, e.g., benzyl alcohol.

In a further preferred alternative, the radical Z of the etherified terminal methylol group of the ortho-fused resole has a structure of formula (IV) as described above. Preferably in this case, in formula (IV), n=0, one of the radicals R has a resole structure of formula (IIIb), and the other radicals are ethoxy groups, or all of the radicals R in formula (IV) are ethoxy groups. Resoles of these kinds are preparable by reacting the unetherified hydroxyl groups (i.e., the hydroxyl groups of the unetherified terminal methylol groups —CH$_2$OH) of an ortho-fused resole with esters of orthosilicic acid. For details, reference may be made to patent application WO 2009/130335.

In the phenolic resin a), the ratio of terminal methylol groups CH$_2$OH to etherified terminal methylol groups CH$_2$OZ is preferably greater than 1, more preferably greater than 2, with further preference greater than 4, and with particular preference greater than 10. It is understood here that this ratio statement relates not to the terminal methyl groups of an individual resole molecule, but rather to the entirety of the terminal (etherified and unetherified) methylol groups of all the resole molecules in the phenolic resin component (i). The resole a) here is a mixture of resole molecules having two etherified terminal methylol groups, resole molecules having one etherified terminal methylol group, resole molecules having one unetherified terminal methylol group, and resole molecules having two unetherified terminal methylol groups, in accordance with the desired ratio.

Solvents b) as a term embraces both individual compounds with solvent activity and mixtures of different compounds with solvent activity. The solvent b) is a liquid in which constituent a) and any further constituents of the phenolic resin component (i), if they are solids, are in solution, and with which constituent a) and any further constituents of the phenolic resin component (i), if they are liquids, are miscible, and so the phenolic resin component consists of a single liquid phase. The solvent b) serves in particular for adjusting the viscosity of the phenolic resin component (i) such that mixing with a molded material base is made easier.

The solvent b) of the phenolic resin component (i) is preferably selected from the group consisting of
- dialkyl esters of C$_4$-C$_6$ dicarboxylic acids (often referred to in the art as "dibasic esters"), preferably from the group consisting of dimethyl adipate, dimethyl glutarate and dimethyl succinate,
- saturated and unsaturated fatty acid alkyl esters, preferably vegetable oil alkyl esters, preferably from the group consisting of rapeseed oil methyl ester, tall oil methyl ester, tall oil butyl ester, methyl laurate, isopropyl laurate, isopropyl myristate and isobutyl myristate,
- alkylene carbonates, preferably propylene carbonate,
- substances of the group consisting of cashew nut shell oil, components of cashew nut shell oil and derivatives of cashew nut shell oil, preferably cardol, cardanol and also derivatives and oligomers of these compounds,
- hydrocarbons which are liquid at 25° C. and 101.325 kPa, preferably from the group consisting of cycloalkanes, alkanes having 6 to 22 carbon atoms, and aromatic hydrocarbons, where the aromatic hydrocarbons are preferably selected from the group consisting of alkylbenzenes, alkenylbenzenes, dialkylnaphthalenes, dialkenylnaphthalenes,
- compounds from the group of the alkylsilanes, alkyl/alkoxysilanes, alkoxysilanes, alkylsiloxanes, alkyl/alkoxysiloxanes and alkoxysiloxanes of the formula (I)

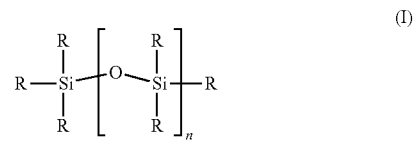

(I)

where n in formula (I) is an integer from 0 to 20, and
each R, independently of the other Rs, is selected from the group of alkyl groups having 1 to 6 carbon atoms and alkoxy groups having one to 6 carbon atoms
and mixtures thereof.

Compounds of the formula (I), in which n=0 and all groups R are alkyl groups are alkylsilanes. Compounds of the formula (I), in which n=0 and all groups R are alkoxy groups are alkoxysilanes (also referred to as alkyl silicates). Compounds of the formula (I), in which n=0 and one or more groups R are alkyl groups, and the rest of the groups R are alkoxy groups, are alkyl/alkoxysilanes. Compounds of the formula (I), in which n>0 and all groups R are alkyl groups are alkylsiloxanes. Compounds of the formula (I), in which n>0 and all groups R are alkoxy groups are alkoxysiloxanes. Compounds of the formula (I) in which n>0 and one or more groups R are alkyl groups, and the rest of the groups R are alkoxy groups, are alkyl/alkoxysiloxanes. Preferred compounds of the formula (I) are alkoxysilanes (alkyl silicates) (i.e., in formula (I) n=0) and alkoxysiloxanes (alkyl silicate oligomers) in which n is an integer from 2 to 5, where the alkoxy groups are preferably ethoxy, propoxy or butoxy groups. Particularly preferred are tetraethyl orthosilicate (TEOS) and ethoxysiloxanes in which n is an integer from 2 to 5.

The term "hydrocarbons", according to its customary meaning in the field of chemistry, denotes organic compounds consisting only of carbon and hydrogen.

Particularly preferred phenolic resin components (i) are those in which
a) the phenolic resin is selected from the group of the ortho-fused resoles as described above, and
b) the solvent is selected from the group of preferred solvents as described above.

In one particularly preferred embodiment of the binder system of the invention, the phenolic resin component (i) comprises
a) an ortho-fused resole whose molecules each have the following structural features:

aromatic rings formed from phenol monomers and linked by methylene ether bridges in the ortho, ortho' position terminal methylol groups —CH$_2$OH and/or terminal alkoxymethylene groups CH$_2$OZ, in which Z is a hydrocarbyl radical having 1 to 12 carbon atoms at least one aromatic ring of 6 carbon atoms per molecule, where a hydroxyl group is bonded to one of the carbon atoms of the aromatic ring, and a hydrocarbyl radical is bonded to at least one of the carbon atoms of the aromatic ring, where the hydrocarbyl radical contains 11 to 26 carbon atoms and 0 to 4 double bonds, b) a solvent comprising compounds from the group consisting of hydrocarbons which are liquid at 25° C. and 101.325 kPa, preferably from the group consisting of cycloalkanes, alkanes having 6 to 22 carbon atoms, and aromatic hydrocarbons, where the aromatic hydrocarbons are preferably selected from the group consisting of alkylbenzenes, alkenylbenzenes, dialkylnaphthalenes, dialkenylnaphthalenes, alkylsilanes, alkyl/alkoxysilanes, alkoxysilanes, alkylsiloxanes, alkyl/alkoxysiloxanes and alkoxysiloxane of the formula (I)

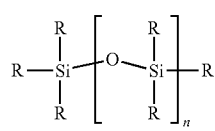

where n is an integer from 0 to 20 each R independently of the other Rs is selected from the group of alkyl groups having one to 6 carbon atoms and alkoxy groups having one to 6 carbon atoms in a concentration of 80% or more, preferably 90% or more, more preferably 95% or more, based on the mass of the solvent b).

For further details, reference may be made to patent application WO 2018/113852 A1.

The phenolic resin component (i) of the binder system of the invention optionally includes further constituents.

The phenolic resin component (i) of the binder system of the invention preferably contains as small as possible a concentration of g) molecular formaldehyde.

Molecular formaldehyde (often also referred to as "free formaldehyde") is formaldehyde which is not bound in the phenolic resin a), but is instead present in molecular form. The term "molecular formaldehyde" here embraces both monomeric formaldehyde and oligomeric and polymeric forms such as paraformaldehyde (mixture of short-chain, linear poly(oxymethylene)s composed of 2 or more monomer units) and 1,3,5-trioxane.

Molecular formaldehyde contained in the phenolic resin component (i) and carried into a molding material mixture during the production of the molding material mixture is a key source—as mentioned above—of the formaldehyde emissions which the invention is aimed at diminishing.

In certain cases it is preferable for the concentration of molecular formaldehyde g) to be less than 0.1%, more preferably less than 0.08%, very preferably less than 0.05%, with the concentration being based in each case on the total mass of the phenolic resin component (i).

The concentration of the formaldehyde g) in molecular form in the phenolic resin component (i) may be determined for example by the KCN method. With this method, the sample for analysis is dissolved in a mixture of isopropanol and distilled water in an isopropanol:H$_2$O mixing ratio of 3:1, and molecular formaldehyde contained in the sample undergoes quantitative conversion to cyanohydrin through the addition of potassium cyanide in excess. The excess of potassium cyanide is subsequently back-titrated with mercury (II) nitrate solution and diphenylcarbazone as indicator.

The KCN method is carried out preferably according to the detailed description below. Solutions required here are as follows:

| | |
|---|---|
| IPA/water | Mixture of isopropanol (IPA) (purity level: p.A.) and distilled water isopropanol:H$_2$O mixing ratio = 3:1 |
| KCN solution | Aqueous KCN solution KCN concentration: 0.1 mol/l |
| Phosphate buffer solution: | Preparation: Make up an initial charge of 348 g of K$_2$HPO$_4$ and 136 g of KH$_2$PO$_4$ in a 1 L standard flask to 1 L with deionized water and mix until a clear solution is formed. |
| Borate buffer solution: | Preparation: Make up an initial charge of 76.4 g of K$_2$B$_4$O$_7$ × 2H$_2$O (purity level: p.A.) in a 1 L standard flask to 1 L with deionized water and mix until a clear solution is formed. |
| Hg(NO$_3$)$_2$ solution: | Aqueous Hg(NO$_3$)$_2$ solution, Hg(NO$_3$)$_2$ concentration: 0.05 mol/l |
| Indicator solution: | Solution of diphenylcarbazone in methanol, diphenylcarbazone concentration: 1% by weight |

A blank value must be determined prior to each measurement. For this purpose, a 400 ml beaker is initially charged with 100 ml of "IPA/water". Mixing takes place with a magnetic stirrer and first 40 ml of borate buffer solution and then 20 ml of KCN solution are added. After two minutes, 5 ml of phosphate buffer solution and 3 to 5 drops of indicator solution are added, and so the solution is observed to color. Titration takes place with a 0.05 molar aqueous Hg(NO$_3$)$_2$ solution. The end point of the titration is apparent from the color change to violet. The color ought to be stable for at least 10 seconds after the end point is reached. The consumption of 0.05 M Hg(NO$_3$)$_2$ solution is recorded as the "blank value".

In the performance of the formaldehyde determination, it should be ensured that the initial sample mass is adjusted in line with the anticipated formaldehyde content, and is preferably selected such that around 10 to 20 ml of 0.05 molar Hg(NO$_3$)$_2$ solution are needed for the titration. The table below gives guide values for the initial sample mass to be selected:

| Anticipated formaldehyde content [%] | Initial sample mass [g] |
|---|---|
| <0.05% | 10 to 40 g |
| 0.05 to 0.5% | 3 to 10 g |
| 0.5 to 1.0% | 2 to 3 g |

The sample is weighed out using an analytical balance in a 400 ml beaker and dissolved in 100 ml of "IPA/water". Mixing takes place with a magnetic stirrer, and first 40 ml of borate buffer solution and then 20 ml of KCN solution are added. The pH of the solution ought to be in the region of 9.3. At the end of a two-minute reaction time (measured from the moment of addition of the KCN solution), 5 ml of phosphate buffer solution and 3 to 5 drops of indicator solution are added, and so the solution is observed to color. Titration takes place with a 0.05 molar aqueous $Hg(NO_3)_2$ solution. The end point of the titration is apparent from the color change to violet. The color ought to be stable for at least 10 seconds after the end point is reached. The consumption of 0.05 M $Hg(NO_3)_2$ solution is recorded as the "consumed value".

The concentration of molecular formaldehyde g) in [% by weight] is calculated using the following formula:

$$\text{molecular formaldehyde [\% by weight]} = \frac{(\text{blank value [ml]} - \text{consumed value [ml]}) \times 0.294 \, [g/ml]}{\text{Sample weight [g]}}$$

The concentration of molecular formaldehyde g) in the phenolic resin component (i) may be determined with similar accuracy by HPLC, with HPLC determination being generally preferred.

In the preparation of the above-described preferred phenolic resins a) (ortho-fused resoles), as described above, phenol monomers are reacted with a relatively high molar excess of formaldehyde, and consequently high residual amounts of molecular formaldehyde g) are inevitably present alongside the resole a) obtained as product.

In such cases in particular it may be preferred for the phenolic resin component (i) of the binder system of the invention to be admixed with one or more β-dicarbonyl compounds which react with the molecular formaldehyde g). Through reaction with β-dicarbonyl compounds h), molecular formaldehyde in the phenolic resin component (i) is bound in the form of nonvolatile reaction products, and so the concentration of molecular formaldehyde in the phenolic resin component (i) is reduced. In certain cases, therefore, the phenolic resin component (i) of a binder system of the invention comprises h) one or more reaction products formed by reaction of one or more β-dicarbonyl compounds with formaldehyde.

The term "β-dicarbonyl compounds" (beta-dicarbonyl compounds), in accordance with its customary meaning in the field of chemistry, refers to organic compounds having two carbonyl groups C=O per molecule, where the carbon atoms of the two carbonyl groups are connected to one another via a single carbon atom which is not part of a carbonyl group. Through reactions with formaldehyde, β-dicarbonyl compounds are capable of binding molecular formaldehyde with formation of nonvolatile reaction products—that is, they act as formaldehyde scavengers. This activity of β-dicarbonyl compounds is described in references including patent application WO 2016/165916 A1.

Through addition of β-dicarbonyl compounds to the phenolic resin component (i) as described in WO 2016/165916 A1, it is possible to reduce the concentration of molecular formaldehyde g) in the phenolic resin component (i) of the binder system of the invention. Through the use of a phenolic resin component (i) with a low concentration of molecular formaldehyde g), assurance is provided that as little molecular formaldehyde g) as possible is introduced into a molding material mixture comprising the binder system of the invention, and into moldings produced from that mixture. This contributes to reduced emission of formaldehyde during processing of the molding material mixture and during the use of moldings produced from it.

In certain cases, therefore, in the preparation of the phenolic resin component (i), preference is given to adding one or more β-dicarbonyl compounds in a molar excess relative to the total amount of molecular formaldehyde g). For details, reference may be made to patent application WO 2016/165916 A1. In certain cases, accordingly, the phenolic resin component (i) of a binder system of the invention comprises h) one or more β-dicarbonyl compounds and also one or more reaction products formed by reaction of these β-dicarbonyl compounds with formaldehyde, with the total concentration of unreacted β-dicarbonyl compounds and β-dicarbonyl compounds bound in reaction products with formaldehyde preferably being 0.1% to 14%, preferably 0.6% to 5%, the concentration being based in each case on the total mass of the phenolic resin component (i).

The β-dicarbonyl compounds h) present in certain cases in the phenolic resin component (i) of a binder system of the invention are preferably selected from the group of the dialkylesters of malonic acid (dialkyl malonates), where the alkyl groups are selected independently of one another from alkyl groups having 1 to 4 carbon atoms. Particularly preferred are diethyl malonate (malonic acid diethyl ester) and dimethyl malonate (malonic acid dimethyl ester). Examples of typical reaction products of dialkyl malonates with formaldehyde are 2-methylene malonic esters, 2,2-bis(hydroxymethyl) malonic esters, 2-(hydroxymethyl)malonic esters and 2-(3-hydroxy-2-oxapropyl)malonic esters. For further details, reference may be made to patent application WO 2016/165916 A1.

The invention, however, is not confined to the use of those phenolic resin components (i) which contain the above-defined constituent h).

However, even when the phenolic resin component (i) of the binder system of the invention contains only a low concentration of molecular formaldehyde g), it is not possible to prevent moldings produced with a binder system comprising this phenolic resin component (i) releasing formaldehyde over the course of time, owing in particular to the (at least partial) decomposition of the binder (polyurethane formed from the phenolic resin of the phenolic resin component (i) and the polyisocyanate of the polyisocyanate component (ii)) that unavoidably begins under thermal exposure. This formaldehyde is bound in the form of nonvolatile reaction products, through reaction with substances e) selected from the group consisting of amino acids and urea and present in accordance with the invention in component (iii) of the binder system of the invention, and consequently emission of formaldehyde is reduced.

The phenolic resin component (i) of the binder system of the invention preferably includes as small as possible a concentration of i) monomeric compounds from the group of the phenols.

Monomeric compounds from the group of the phenols are phenol monomers which are not bound in the phenolic resin a) but are instead in monomeric form. If the phenolic resin component (i) includes monomeric compounds i) from the group of the phenols, they are usually residual amounts of phenol monomers unconverted during phenolic resin production. Therefore, any monomeric compounds i) from the group of the phenols and present in a phenolic resin component (i) are customarily identical to those phenol monomers which are bound by methylene bridges or methylene ether bridges in the phenolic resin a) of this phenolic resin component (i).

The concentration of monomeric compounds from the group of the phenols i) is preferably 10% or less, more preferably 5% or less, very preferably 1% or less, the concentration being based in each case on the total mass of the phenolic resin component (i).

If the phenolic resin component (i) of the binder system of the invention comprises a resole as phenolic resin a), then the phenolic resin component (i) usually also comprises j) one or more compounds from the group of the hydroxybenzyl alcohols.

Compounds from the group of the hydroxybenzyl alcohols j) are, in particular, saligenin (2-hydroxybenzyl alcohol, o-hydroxybenzyl alcohol) and homosaligenin (4-hydroxybenzyl alcohol, p-hydroxybenzyl alcohol). These compounds form during the preparation of phenolic resins by addition of one molecule of formaldehyde onto one molecule of phenol (hydroxybenzene). For details, reference may be made to DE 10 2016 125 700 A1.

In the phenolic resin component (i) of the binder system of the invention, the concentration of compounds from the group of the hydroxybenzyl alcohols j) is preferably higher than the concentration of monomeric phenol (monomeric hydroxybenzene). The mass ratio of the compounds j) from the group of the hydroxybenzyl alcohols to monomeric phenol (hydroxybenzene) is preferably greater than or equal to 1.2, preferably 1.2 to 30, and/or the mass ratio of saligenin to phenol (hydroxybenzene) is preferably greater than or equal to 1.1, preferably 1.1 to 25, with the concentration of monomeric phenol preferably being in each case less than 2.5%, preferably less than 2%, the concentrations being based in each case on the total mass of the phenolic resin component (i).

In certain cases, the phenolic resin component (i) of the binder system of the invention comprises k) one or more silanes.

In certain cases, the phenolic resin component (i) of the binder system of the invention comprises l) hydrofluoric acid Hydrofluoric acid results in improved moisture resistance on the part of the foundry molds and foundry cores, especially if hydrofluoric acid is used together with silanes l).

In certain cases, binder systems are preferred where the phenolic resin component (i) comprises a) an ortho-fused resole of formula (III) as described above
b) a solvent selected from the group of preferred solvents as described above
h) one or more β-dicarbonyl compounds and also one or more reaction products formed by reaction of these β-dicarbonyl compounds with formaldehyde.

The invention, however, is not confined to binder systems whose phenolic resin component (i) comprises the above-defined constituent h).

Polyisocyanate components (ii) for binder systems, intended more particularly for use in a process from the group consisting of polyurethane cold-box processes and polyurethane no-bake processes, are known in the prior art.

Isocyanates c) having two or more isocyanate groups per molecule are referred to generally as polyisocyanates. Isocyanates having exactly two isocyanate groups per molecule are referred to specifically as diisocyanates.

The isocyanates c) having at least two isocyanate groups per molecule are preferably selected from the group consisting of methylenebis(phenyl isocyanates) (abbreviated to MDI, they are often referred to in practice as diphenylmethane diisocyanates), preferably 4.4'-methylenebis(phenyl isocyanate),
polymethylene polyphenyl isocyanates (also referred to as "polymeric MDI"),
aliphatic isocyanates,
cycloaliphatic isocyanates,
isocyanates having at least two isocyanate groups and one carbodiimide group per molecule (also referred to as carbodiimide-modified di- and polyisocyanates, respectively), preferably carbodiimide-modified MDI,
isocyanates having at least two isocyanate groups and one urethonimine group per molecule (also referred to as urethonimine-modified di- and polyisocyanates, respectively), preferably urethonimine-modified MDI.

The term "polymeric MDI" also embraces mixtures of different polymethylene polyphenyl isocyanates.

Structure and preparation of carbodiimide-modified di- and polyisocyanates and urethonimine-modified di- and polyisocyanates are known to the person skilled in the art and are described in references including the Kunststoff-Handbuch [Plastics handbook], volume 7 "Polyurethane" [Polyurethanes] (Carl Hanser Verlag Munich Vienna 1993), in the textbook "Synthetic Methods in Step-Growth Polymers" (edited by Martin E. Rogers and Timothy Long, Wiley 2003), and also, for example, in EP 0 054 294 B1, WO 2007/065578A1, and U.S. Pat. No. 10,011,677 B2. The use of carbodiimide- and/or urethonimine-modified MDI in a process from the group consisting of polyurethane cold-box processes and polyurethane no-bake processes is described in references including in EP 2 640 764 B1.

It is possible to use mixtures of different isocyanates c) having at least two isocyanate groups per molecule, examples being mixtures of MDI and polymeric MDI
mixtures of MDI with carbodiimide-modified MDI and/or urethonimine-modified MDI
mixtures of polymeric MDI with carbodiimide-modified MDI and/or urethonimine-modified MDI.

In certain preferred variants, the polyisocyanate component comprises d) a solvent.

Solvents d) as a term embraces both individual compounds with solvent activity and mixtures of different compounds with solvent activity. The solvent d) is a liquid in which constituents c) and any further constituents of the polyisocyanate component (ii), if they are solids, are in solution, and with which constituents c) and any further constituents of the polyisocyanate component (ii), if they are liquids, are miscible, and so the polyisocyanate component consists of a single liquid phase. The solvent d) serves in particular for adjusting the viscosity of the polyisocyanate component (ii) such that mixing with a molded material base is made easier.

The solvent d) is preferably selected from the group consisting of dialkyl esters of $C_4$-$C_6$ dicarboxylic acids (often referred to in the art as "dibasic esters"), preferably from the group consisting of dimethyl adipate, dimethyl glutarate and dimethyl succinate,
saturated and unsaturated fatty acid alkyl esters, preferably vegetable oil alkyl esters, preferably from the group consisting of rapeseed oil methyl ester, tall oil methyl ester, tall oil butyl ester, methyl laurate, isopropyl laurate, isopropyl myristate and isobutyl myristate, alkylene carbonates, preferably propylene carbonate, hydrocarbons which are liquid at 25° C. and 101.325 kPa, preferably from the group consisting of cycloalkanes, alkanes having 6 to 22 carbon atoms, and aromatic hydrocarbons, where the aromatic hydrocarbons are preferably selected from the group consisting of alkylbenzenes, alkenylbenzenes, dialkylnaphthalenes, dialkenylnaphthalenes, compounds from the group of the alkylsilanes, alkyl/alkoxysilanes, alkoxysilanes, alkylsiloxanes, alkyl/alkoxysiloxanes and alkoxysiloxanes of the formula (I)

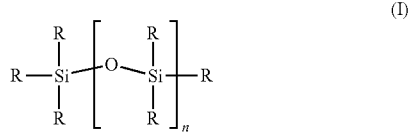

where n in formula (I) is an integer from 0 to 20, and each R, independently of the other Rs, is selected from the group of alkyl groups having one to 6 carbon atoms and alkoxy groups having one to 6 carbon atoms and mixtures thereof.

Compounds of the formula (I), in which n=0 and all groups R are alkyl groups are alkylsilanes. Compounds of the formula (I), in which n=0 and all groups R are alkoxy groups are alkoxysilanes (also referred to as alkyl silicates). Compounds of the formula (I), in which n=0 and one or more groups R are alkyl groups, and the rest of the groups R are alkoxy groups, are alkyl/alkoxysilanes. Compounds of the formula (I), in which n>0 and all groups R are alkyl groups are alkylsiloxanes. Compounds of the formula (I), in which n>0 and all groups R are alkoxy groups are alkoxysiloxanes. Compounds of the formula (I) in which n>0 and one or more groups R are alkyl groups, and the rest of the groups R are alkoxy groups, are alkyl/alkoxysiloxanes. Preferred compounds of the formula (I) are alkoxysilanes (alkyl silicates) (i.e., in formula (I) n=0) and alkoxysiloxanes (alkyl silicate oligomers) in which n is an integer from 2 to 5, where the alkoxy groups are preferably ethoxy, propoxy or butoxy groups. Particularly preferred are tetraethyl orthosilicate (TEOS) and ethoxysiloxanes in which n is an integer from 2 to 5.

The term "hydrocarbons", according to its customary meaning in the field of chemistry, denotes organic compounds consisting only of carbon and hydrogen.

Particularly preferred binder systems of the invention are those where in the polyisocyanate component (ii)

c) one or more (preferably all of the) isocyanates having at least two isocyanate groups per molecule are selected from the group of preferred isocyanates as described above, and d) the solvent is selected from the group of preferred solvents as described above.

Especially preferred binder systems are those where in the polyisocyanate component (ii)

c) one or more isocyanates from the group consisting of MDI, polymeric MDI, carbodiimide-modified MDI and urethonimine-modified MDI and mixtures thereof, the total concentration of the stated isocyanates c) being 75% to 95%, and d) as solvents
one or more compounds from the group of the alkoxysilanes (alkyl silicates) of the formula (I) as defined above (i.e. in formula (I) n=0) and alkoxysiloxanes (alkyl silicate oligomers) of the formula (I) as defined above in which n is an integer from 2 to 5, the alkoxy groups preferably being ethoxy groups, preferably tetraethyl orthosilicate or one or more compounds from the group of the alkylene carbonates (preferably propylene carbonate) and the fatty acid alkyl esters (preferably from the group consisting of rapeseed oil methyl ester and tall oil methyl ester), the concentration of the solvent d) being 5% to 25%, where the concentration of constituents c) and d) is based in each case on total mass of the polyisocyanate component (ii).

In certain cases it is preferable for the polyisocyanate component (i) of the binder system of the invention to comprise m) one or more β-dicarbonyl compounds in a concentration of 1% to 38%, preferably 1% to 20%, more preferably 1% to 10% and very preferably 1% to 5%, based on the total mass of the polyisocyanate component (ii).

As described above, β-dicarbonyl compounds are capable, through reactions, of binding molecular formaldehyde with formation of nonvolatile reaction products. As there is no formaldehyde in the polyisocyanate component (ii) of the binder system of the invention, the aforementioned reaction of β-dicarbonyl compounds m) with formaldehyde only takes place when the β-dicarbonyl compounds m) contained in the polyisocyanate component (ii) of the binder system of the invention come into contact with molecular formaldehyde. This is the case, for example, when, during the production of a molding material mixture, the polyisocyanate component (ii) of the binder system of the invention comes into contact with the phenolic resin component (i) of the binder system of the invention, which contains a significant concentration of molecular formaldehyde (as described above), or when a molding produced from such a molding material mixture is subject to thermal exposure.

The β-dicarbonyl compounds m) present in the polyisocyanate component (ii) of a binder system of the invention are preferably selected from the group of the dialkyl esters of malonic acid (dialkyl malonates), where the alkyl groups are selected independently of one another from alkyl groups having 1 to 4 carbon atoms. Particularly preferred are diethyl malonate (malonic acid diethyl ester) and dimethyl malonate (malonic acid dimethyl ester). Examples of typical reaction products of dialkyl malonates with formaldehyde are 2-methylene malonic esters, 2,2-bis(hydroxymethyl) malonic esters, 2-(hydroxymethyl)malonic esters and 2-(3-hydroxy-2-oxapropyl)malonic esters. For further details, reference may be made to patent application WO 2016/165916 A1. With particular preference the β-dicarbonyl compounds h) present in the phenolic resin component (i) of a binder system of the invention are identical to the β-dicarbonyl compounds m) present in the polyisocyanate component (ii) of this binder system.

The invention, however, is not confined to the use of those polyisocyanate components (ii) which include the above-defined constituent m).

It is true that in the invention it is possible to produce moldings using a binder system whose phenolic resin component (i) has a very low concentration of molecular formaldehyde g) (as described above), and to cure the binder system without supply of heat by a process from a group consisting of the polyurethane cold-box process and the polyurethane no-bake process (for details see below). However, even moldings produced in this way have a tendency over time to release formaldehyde, especially on thermal exposure. This formaldehyde is bound by reaction with substances e) selected from the group consisting of amino acids and urea and present in accordance with the invention in component (iii) of the binder system, and also with any β-dicarbonyl compounds m) present in the polyisocyanate component (ii), to form nonvolatile reaction products, thereby reducing the emission of formaldehyde.

In certain cases the polyisocyanate component (ii) comprises further constituents n). Hence in certain cases it is preferred for the polyisocyanate component (ii) to comprise
  n) one or more substances from the group consisting of
    silanes,
    acid chlorides, e.g., phosphoryl chloride, phthaloyl chloride,
    chlorosilanes,
    methane sulfonic acid,
    esters of phosphorus-oxygen acids,
    additive preparable by reacting a preliminary mixture of
      (av) 1.0% to 50.0% of methane sulfonic acid
      (bv) one or more esters of one or more phosphorus-oxygen acids, where the total amount of the esters (bv) is in the range from 5.0% to 90.0%,
      (cv) one or more silanes selected from the group consisting of amino silanes, epoxy silanes, mercapto silanes and ureido silanes, where the total amount of the silanes (cv) is in the range from 5.0% to 90.0%,
      where the fraction of water is not more than 0.1%,
      based in each case on the total amount of constituents (av), (bv) and (cv) in the preliminary mixture.

The above-stated constituents n) serve essentially, by inhibiting polyurethane formation, to extend the period of time over which a molding material mixture into which both components of the binder system have been mixed can be stored in spite of the high reactivity of the binder system ("sand lifetime") without becoming unusable, i.e. no longer capable of being molded. Long sand lifetimes are desirable so that a prepared batch of a molding material mixture does not become unusable as a result of premature curing of the binder system. The above-stated additives are also referred to as bench life extenders and are known to the person skilled in the art. Use is typically made conventionally in particular of acid chlorides from a group consisting of phosphoryl chloride $POCl_3$ (CAS No. 10025-87-3), o-phthaloyl chloride (1,2-benzenedicarbonyl chloride, CAS No. 88-95-9) and benzene phosphorus oxydichloride (CAS No: 842-72-6). Further suitable additives are methane sulfonic acid and also phosphorus-oxygen acids, preferably from the group consisting of phosphinic acid, phosphonic acid, phosphoric acid, peroxophosphoric acid, hypodiphosphonic acid, diphosphonic acid, hypodiphosphoric acid, diphosphoric acid and peroxodiphosphoric acid. One preferred sand lifetime extender additive is an additive mixture preparable by reacting a preliminary mixture of the above-stated components (av), (bv) and (cv) as described in patent application WO 2013/117256.

In certain cases the polyisocyanate component (ii) comprises one or more further constituents n) from the group of plasticizers.

Based on the total mass of the polyisocyanate component (ii), the total concentration of all substances n) is 5% or less, preferably 3% or less.

In one preferred embodiment of the binder system of the invention, one or both of components (i) and (ii) further comprise(s)
  o) one or more silicone surfactants comprising per molecule at least one structural unit $-Si(C_nH_{2n+1})_2-O-$, where n is an integer from 1 to 3, and at least one polyalkoxy group,
  where the concentration of the silicone surfactants o) is preferably 0.001% to 1.0%, preferably from 0.001% to 0.8% and especially preferably from 0.002% to 0.5%, based on the sum total of the mass of component (i) and the mass of component (ii). For preferred silicone surfactants, reference made be made to EP 3 333 205 A1. Irrespective of whether only the phenolic resin component (i), or only the polyisocyanate component (ii) or both components (i) and (ii), comprise(s) silicone surfactants o), the concentration of the silicone surfactants o) is preferably 0.001% to 1.0%, more preferably 0.001% to 8% and especially preferably from 0.002% to 0.5%, based on the sum total of masses of component (i) and of component (ii).

In a binder system of the invention, the person skilled in the art will select the amount of component (iii) and hence of the substances e) contained therein and selected from the group consisting of amino acids and urea in such a way that it is sufficient to bind as high as possible a fraction of the molecular formaldehyde g), present in the phenolic resin component (i) of the binder system, and of the formaldehyde released during processing of a molding material mixture produced with the binder system of the invention and during the further processing (especially that involving thermal exposure), storage and use of moldings produced therefrom, through formation of nonvolatile reaction products. In this context, the person skilled in the art bears in mind that the amount of component (iii) to be used, and hence of the substances e) contained therein, must be selected such that the reactivity between the binder components (i) and (ii) is not adversely affected, the sand lifetime (see above) is not unacceptably shortened, and the strength of a molding produced from a molding material mixture comprising the binder system of the invention is not impaired.

The amount of component (iii), and hence of the substances e) contained therein, that is to be used is therefore guided by the amount of phenolic resin component (i) to be used for producing the molding material mixture, optionally by the presence of further formaldehyde scavengers in the binder system (e.g., the aforementioned β-dicarbonyl compounds present in the phenolic resin component (i) and/or in the polyisocyanate component (ii) of certain binder systems of the invention) and/or the possibility of providing the molding produced with a coating containing formaldehyde scavenger (further details of this are described later on below), and also by the requirements of binder system reactivity and of the strength of a molding produced from a molding material mixture comprising the binder system of the invention.

If the binder system of the invention contains no formaldehyde scavengers other than the substances e) selected from the group consisting of amino acids and urea in component (iii), then the molar ratio of the substances e) to the total amount of available formaldehyde is preferably 4:1 to 1:1. If the binder system of the invention does contain further formaldehyde scavengers as well as the substances e) selected from the group consisting of amino acids and urea in component (iii), then the molar ratio of the entirety of all the formaldehyde scavengers to the total amount of available formaldehyde is preferably 4:1 to 1:1. Available formaldehyde in this context refers to the total amount of molecular formaldehyde g) present in the phenolic resin component (i) of the binder system and of the formaldehyde which can be released on decomposition of the binder; in this regard, see the above explanation regarding the two sources of formaldehyde emissions.

A second aspect of the present invention relates to a molding material mixture comprising a molding material base and also components (i), (ii) and (iii) of a binder system in accordance with the first aspect of the present invention.

The observations above concerning the first aspect of the present invention are valid in relation to preferred binder systems.

The molding material mixture according to the second aspect of the present invention comprises
components (i), (ii) and (iii) of a binder system according to the above-described first aspect of the present invention
and a molding material base
and optionally further constituents,
where the total concentration of components (i) and (ii) of the binder system according to the above-described first aspect of the present invention is typically 0.6% to 14%, based on the total mass of the molding material mixture.

In molding material mixtures for producing foundry cores or foundry molds, the total concentration of components (i) and (ii) of the binder system according to the above-described first aspect of the present invention is typically 0.6% to 3%, preferably 0.8% to 2%, more preferably 1.0% to 1.6%, based on the total mass of the molding material mixture.

In molding material mixtures for producing feeders, the total concentration of components (i) and (ii) of the binder system according to the above-described first aspect of the present invention is typically 8% to 14%, preferably 10% to 12%, based on the total mass of the molding material mixture.

In the molding material mixture of the invention, the stoichiometric ratio of isocyanate groups in the polyisocyanate component (ii) to hydroxyl groups in the phenolic resin component (i) is preferably in the range from 0.5 to 1.5, further preferably in the range from 0.6 to 1.4, more preferably in the range from 0.7 to 1.3, particularly preferably in the range from 0.8 to 1.2, very particularly preferably in the range from 0.9 to 1.1, especially preferably in the range from 0.95 to 1.05. While in many cases it is preferable that the stoichiometric ratio of isocyanate groups in the polyisocyanate component (ii) to hydroxyl groups in the phenolic resin component (i) is close to 1, there are also cases in which it is advantageous that there is an excess of isocyanate groups relative to the hydroxyl groups, and also cases in which it is advantageous that there is an excess of hydroxyl groups relative to isocyanate groups.

The term "molding material base" embraces not only individual materials with molding material base suitability, but also mixtures of different materials with molding material base suitability.

Suitability as molding material bases is possessed by all molding material bases that are typically used for producing feeders, foundry molds and foundry cores, examples being silica sand and specialty sands. The term "specialty sand" embraces natural mineral sands and also products of sintering and melting that are produced in granular form or are converted to granular form by crushing, grinding and classifying operations, and inorganic mineral sands formed through other physicochemical procedures and used as molding material bases with standard foundry binders for the manufacture of feeders, cores and molds. Specialty sands include
aluminum silicates in the form of natural minerals or mineral mixtures such as J sand and Kerphalite KF,
aluminum silicates in the form of industrial sintered ceramics such as, for example, fireclay and Cerabeads,
natural heavy minerals such as R sand, chromite sand and zircon sand,
industrial oxide ceramics such as M sand and bauxite sand,
and industrial nonoxide ceramics such as silicon carbide.

The molding material base preferably comprises a fraction of recycled foundry sand.

Molding material mixtures for producing feeders are also referred to as feeder compounds. A feeder compound of the invention comprises, further to components (i) and (ii) of a binder system according to the above-described first aspect of the present invention and a molding material base, typically insulating fillers such as hollow microbeads, optionally fiber material, and, in the case of exothermic feeders, an oxidizable metal and an oxidizing agent for the oxidizable metal. The production of feeders by the polyurethane cold-box process, and also materials suitable as feeder constituents, are known to the person skilled in the art—see, for example, WO 2008/113765 and DE 10 2012 200 967.

Where the phenolic resin component (i) incorporated into the molding material mixture contains molecular formaldehyde g), this formaldehyde reacts with the substance or substances e) selected from the group consisting of amino acids and urea, introduced through component (iii) of the binder system of the invention, to form nonvolatile reaction products, thereby reducing emissions of molecular formaldehyde g) from the molding material mixture. In this case the molding material mixture comprises (as well as the above-mentioned constituents) one or more reaction products of formaldehyde with one or more substances e) selected from the group consisting of amino acids and urea.

Since it is not impossible that the molding produced in the process of the invention from the molding material mixture releases further molecular formaldehyde in the course of its storage, further working or when it is used, it is advantageous for the molding material mixture of the invention to comprise not only the reaction products formed by reaction of substances e) selected from the group consisting of amino acids and urea with molecular formaldehyde g) from the phenolic resin component (i), but also unreacted substances e) selected from the group consisting of amino acids and urea. For this purpose, the concentration of the substances e) selected from the group consisting of amino acids and urea and introduced into the molding material mixture with component (iii) is set such that there is a molar excess relative to the amount of molecular formaldehyde g) introduced into the molding material mixture with the phenolic resin component (i). The observations above regarding the first aspect of the present invention are valid in respect of preferred substances e) selected from the group consisting of amino acids and urea).

In the molding material mixture of the invention, preferably, the total amount of
unreacted substances e) selected from the group consisting of amino acids and urea
and
substances e) selected from the group consisting of amino acids and urea and bound in reaction products with formaldehyde is 0.1% to 5.0%, preferably 0.1% to 3.5%, more preferably 0.1% to 2.0%, and very preferably 0.5% to 2.0%, based on the total mass of the molding material mixture.

In one particularly preferred molding material mixture of the invention, the total amount of
glycine
and
glycine bound in reaction products with formaldehyde is 0.1% to 5.0%, preferably 0.1% to 3.5%, more preferably 0.1% to 2.0%, and very preferably 0.5% to 2.0%, based on the total mass of the molding material mixture.

A third aspect of the present invention relates to a process comprising the steps of:
producing a molding material mixture by mixing a molding material base with components (i), (ii) and (iii) of a binder system according to the first aspect of the present invention, and optionally further constituents of the molding material mixture to be produced,
molding the molding material mixture,
curing the binder system in the molded molding material mixture, to form a molding.

In the process of the invention, the molding formed by curing the binder system in the molded molding material mixture may be subjected to further working with supply of heat. The process of the invention may comprise a further step of working which comprises thermal treatment of the molding formed by curing the binder system in the molded molding material mixture.

The observations above relating to the second aspect of the present invention are valid in respect of preferred molding material mixtures.

To produce the molding material mixture, components (i) and (ii) of the binder system of the invention are preferably metered such that the total concentration of components (i) and (ii) of the binder system is 0.6% to 14%, based on the total mass of the molding material mixture.

To produce the molding material mixture, components (i) and (ii) of the binder system of the invention are preferably metered such that the stoichiometric ratio of isocyanate groups in the isocyanates c) to hydroxyl groups in the phenolic resins a) is in the range from 0.5 to 1.5.

To produce the molding material mixture, the person skilled in the art will meter the amount of component (iii) to be used, and therefore of the substances e) contained therein and selected from the group consisting of amino acids and urea, in such a way that it is sufficient to bind as high as possible a fraction of the molecular formaldehyde g) present in the phenolic resin component (i) of the binder system and of the formaldehyde released during processing of the molding material mixture and during further processing (especially with thermal exposure), storage and use of moldings produced therefrom, through formation of nonvolatile reaction products. The person skilled in the art bears in mind here that the amount of component (iii) to be used and hence of the substances e) contained therein must be selected such that the reactivity between the binder components (i) and (ii) is not adversely affected, the sand lifetime (see above) is not unacceptably shortened, and the strength of a molding produced from a molding material mixture comprising the binder system of the invention is not impaired.

The amount of component (iii), and hence of the substances e) contained therein, that is to be used is therefore guided by the amount of phenolic resin component (i) to be used for producing the molding material mixture, optionally by the presence of further formaldehyde scavengers in the binder system (e.g., the aforementioned β-dicarbonyl compounds) and/or the possibility of providing the molding produced with a coating containing formaldehyde scavenger (further details of this are described later on below), and also by the requirements of binder system reactivity and of the strength of a molding produced from a molding material mixture comprising the binder system of the invention.

If the binder system of the invention contains no formaldehyde scavengers other than the substances e) selected from the group consisting of amino acids and urea in component (iii), then the molar ratio of the substances e) to the total amount of available formaldehyde is preferably 4:1 to 1:1. If the binder system of the invention does contain further formaldehyde scavengers as well as the substances e) selected from the group consisting of amino acids and urea in component (iii), then the molar ratio of the entirety of all the formaldehyde scavengers to the total amount of available formaldehyde is preferably 4:1 to 1:1. Available formaldehyde in this context refers to the total amount of molecular formaldehyde g) present in the phenolic resin component (i) of the binder system and of the formaldehyde which can be released on decomposition of the binder; in this regard, see the above explanation regarding the two sources of formaldehyde emissions.

To produce the molding material mixture, component (iii) of the binder system of the invention is with particular preference metered such that the total amount of substances e) selected from the group consisting of amino acids and urea is 0.1% to 5.0%, preferably 0.1% to 3.5%, very preferably 0.1% to 2.0%, and especially preferably 0.5% to 2.0%, based on the total mass of the molding material mixture. If component (iii) of the binder system of the invention comprises glycine as substance e), then preferably, for producing the molding material mixture, component (iii) is metered in such that the amount of glycine is 0.1% to 5.0%, preferably 0.1% to 3.5%, very preferably 0.1% to 2.0%, and especially preferably 0.5% to 2.0%, based on the total mass of the molding material mixture.

The molding material mixture is typically molded by filling, blowing or shooting the molding material mixture into a mold and thereafter optionally compacting it.

The binder system in the molded molding material mixture is cured preferably without supply of heat. For this purpose, to cure the binder system, the molded molding material mixture is contacted
with a gaseous tertiary amine or with a mixture of two or more gaseous tertiary amines
or
with a liquid tertiary amine or with a mixture of two or more liquid tertiary amines.

The curing of a binder system comprising a phenolic resin component (i) and a polyisocyanate component (ii) in the presence of a gaseous tertiary amine or of a mixture of two or more gaseous tertiary amines is known in the prior art as the polyurethane cold-box process; the curing of a binder system comprising a phenolic resin component (i) and a polyisocyanate component (ii) in the presence of a liquid tertiary amine or of a mixture of two or more gaseous tertiary amines is known in the prior art as the polyurethane no-bake process.

The tertiary amine is preferably selected from the group consisting of triethylamine, dimethylethylamine, diethylmethylamine, dimethylisopropylamine, dimethylpropylamine and mixtures thereof. The tertiary amines for use are liquid at room temperature and for use in the polyurethane cold-box process are evaporated by supply of heat, and the evaporated tertiary amine is sprayed or injected—optionally by means of a carrier gas stream—into the mold.

In principle it is also possible to cure the binder system of the invention by supply of heat. Corresponding technologies are known to the person skilled in the art (e.g., the hot-box process). In the invention, however, curing of the binder system with supply of heat is not preferred.

The molding produced in the process of the invention comprises a molding material base bound by a polyurethane which has been formed by curing a binder system according to the first aspect of the present invention. The molding produced in the process of the invention further comprises one or more substances e) selected from the group consisting of amino acids and urea and/or one or more reaction products formed by reaction of these substances e) with formaldehyde. In a preferred variant of the process of the invention, the molding produced comprises e) glycine and/or one or more reaction products formed by reaction of glycine with formaldehyde.

Such reaction products come about in the process of the invention firstly when molecular formaldehyde g) is entrained by the phenolic resin component (i) during the production of the molding material mixture, and secondly and in particular when the binder system in the molded molding material mixture is cured with supply of heat (which, however, is not preferred in the invention), and also when the molding formed by curing of the binder system in the molded molding material mixture is subjected to further working with supply of heat (for details see below). Consequently it is preferred that the molding formed by curing of the binder system comprises, further to any one or more reaction products formed by reaction of the substances e) selected from the group consisting of amino acids and urea with molecular formaldehyde g) from the phenolic resin component (i), one or more unreacted substances e), selected from the group consisting of amino acids and urea, which bind formaldehyde produced during further working of the molding, by formation of nonvolatile reaction products, thereby reducing the emission of formaldehyde from the molding. The observations above relating to the first aspect of the present invention are valid in respect of preferred concentration of the substances e) selected from the group consisting of amino acids and urea.

In a first version of the process of the invention, the molding formed by curing the binder system in the molded molding material mixture is an article from the group consisting of feeders, foundry molds and foundry cores; in other words, the molding obtained by the process of the invention can be used as a foundry core, a foundry mold or a feeder without further steps of working. Foundry cores, foundry molds and feeders, and their configuration, functioning, and use, are known to the person skilled in the art.

In a second version of the process of the invention, multiple moldings are formed and combined to form an article from the group consisting of foundry molds and foundry cores or combinations of a foundry mold with a core or with multiple cores. Articles of this kind composed of multiple moldings are referred to, for example, as core packages. Combined foundry molds and foundry cores of this kind, or combinations of this kind between a foundry mold and one or more cores, are required in particular for production of castings of complex geometry. The moldings to be combined with one another are for that purpose inserted into one another, and in special cases also screwed or adhesively bonded with one another.

In a further version of the process of the invention, the molding formed by curing the binder system in the molded molding material mixture is subjected to further steps of working in order to form a foundry core, a foundry mold or a feeder, with the article thus formed, from the group consisting of foundry cores, foundry molds and feeders, comprising the molding formed by curing the binder system in the molded molding material mixture.

In a preferred first specific variant of the process of the invention, the further step of working is that of providing a molding, formed by curing the binder system in the molded molding material mixture, with a coating. In this first specific variant, the process of the invention comprises the steps of producing a molding material mixture by mixing a molding material base with the components (i), (ii) and (iii) of a binder system of the invention and optionally further constituents of the molding material mixture to be produced, molding the molding material mixture, and curing the binder system in the molded molding material mixture, to form a molding, applying a coating composition comprising particles of one or more refractories dispersed in a carrier liquid to the molding, to form a coated molding whose surface has regions provided with the coating composition, thermally treating the coated molding at a temperature above 40° C., preferably in the range from 50° C. to 200° C., to form an article from the group consisting of foundry molds and foundry cores, whose surface has regions in which a coating comprising particles of one or more refractories is disposed.

Coating compositions comprising particles of one or more refractories dispersed in a carrier liquid are also referred to as refractory coating compositions. Refractory coating compositions of this kind are known in the prior art and are described for example in patent application WO 2011/003637 A1. The coatings formed from them are also referred to as refractory coatings, or coatings based on a refractory coating.

In line with the usual understanding of the skilled person (cf. DIN 51060:2000-06), compounds, materials and minerals identified as being "refractory" are those which are able at least briefly to withstand the temperature exposure involved in casting or in solidifying an iron melt, usually cast iron. "Highly refractory" compounds, materials and minerals are those which are able briefly to withstand the heat of casting of a steel melt. The temperatures which may occur during casting of steel melts are usually higher than the temperatures which may occur in the casting of iron or cast iron melts. Refractory compounds, of materials and minerals (refractories) and highly refractory compounds, materials and minerals are known to the person skilled in the art, from DIN 51060:2000-06, for example. Unless otherwise stated, pulverulent refractories have an average particle size (measured preferably by light scattering according to ISO 13320:2009-10) in the range from 0.1 µm to 500 µm, preferably in the range from 1 µm to 200 µm. Particularly suitable refractories are materials having melting points which lie at least 200° C. above the temperature of the particular metal melt used, and/or which do not enter into any reaction with the metal melt. The term "refractory" as used herein also includes highly refractory substances.

The refractories are selected from those refractories that are typically used in refractory coatings, examples being refractories selected from the group consisting of quartz, aluminum oxide, zirconium dioxide, aluminum silicates, nonswellable phyllosilicates, zirconium silicates, olivine, talc, mica, graphite, coke, feldspar, diatomite, kaolins, calcined kaolins, metakaolinite, iron oxide and bauxite.

Compositions for producing coatings based on a refractory coating frequently comprise further constituents such as wetting agents, rheological additives, binders, suspension aids and/or biocides. Suitable wetting agents, rheological additives, binders, suspension aids and biocides, and their function and effect, are known to the person skilled in the art.

The carrier liquid serves merely as a vehicle for applying the substances suspended and dissolved therein to the molding, and is removed by thermal treatment of the coated molding. Under standard conditions (25° C. and 1013.25 hPa), the carrier liquid is in liquid form, and can be evaporated under standard pressure (1013.25 hPa) at temperatures above 40° C., preferably in the range from 50° C. to 200° C. The carrier liquid is preferably selected from the group consisting of water, methanol, ethanol and isopropanol.

The coating composition is applied to the molding typically by a method selected from the group consisting of spraying, dipping, flow coating and painting, preferably dipping.

The thermal treatment of the coated molding at a temperature of above 40° C., preferably in the range from 50° C. to 200° C., removes the carrier liquid from the applied coating composition. The resultant coating, comprising particles of one or more refractories, forms a surface of the foundry mold or foundry core that comes into contact with a metal melt during casting.

Thermal exposure of the molding formed by curing the binder system in the molded molding material mixture frequently gives rise to molecular formaldehyde. If, in the process of the invention, the molding formed by curing the binder system in the molded molding material mixture is to be subjected to a further step of working that includes a thermal treatment, such as, for example, in the above-described first specific variant of the process of the invention, then it is preferred that the molding formed by curing the binder system in the molded molding material mixture comprises one or more substances e) selected from the group consisting of amino acids and urea and binding formaldehyde, arising during further working of said molding, by formation of nonvolatile reaction products, thereby reducing the emission of formaldehyde.

Employed with particular preference in the above-described first specific variant of the process of the invention is a coating composition which comprises, dispersed in a carrier liquid, particles of one or more refractories, and also one or more compounds capable of forming nonvolatile compounds by reaction with formaldehyde, so that the emission of formaldehyde during thermal treatment for removing the carrier liquid of the coating composition is further reduced. Coating compositions of this kind, and also their preparation, use and effect, are described in DE 10 2018 118 291.0, a patent application from the same applicant as, but unpublished at the priority date of, the present patent application.

Particular preference is given, in the above-described first specific variant of the process of the invention, to using a coating composition which comprises one or more formaldehyde scavengers from the group consisting of β-dicarbonyl compounds
di- and trihydric phenols
phenol-formaldehyde novolacs and resorcinol-formaldehyde novolacs
amino acids
primary and secondary aminosilanes
alkali metal hydrogensulfites
melamine, benzoguanamine, urea and derivatives thereof
hydrazine and carbonohydrazide and derivatives thereof
primary and secondary amines
tree resins, tannins and lignins.

Formaldehyde formed in the thermal treatment of the coated molding is bound by the formaldehyde scavengers contained in the applied coating composition, with formation of nonvolatile reaction products, and so the coating formed from the coating composition comprises one or more reaction products formed by reaction of the formaldehyde scavenger contained in the coating composition with formaldehyde.

To maximize reduction of formaldehyde emission, it is preferable in certain cases that in the process of the invention
the molding material mixture is produced using a binder system of the invention whose phenolic resin component (i) comprises
g) molecular formaldehyde in a concentration of less than 0.1%, more preferably less than 0.08%, very preferably less than 0.05%,
h) and one or more β-dicarbonyl compounds,
where the concentration is based in each case on the total mass of the phenolic resin component (i) and
the concentration of the substances e) selected from the group consisting of amino acids and urea and introduced into the molding material mixture with component (iii) is adjusted such that there is a molar excess relative to the amount of molecular formaldehyde g) introduced into the molding material mixture with the phenolic resin component (i)
and
the coating is produced using a coating composition which comprises one or more compounds capable of forming nonvolatile compounds by reaction with formaldehyde.

A preferred second specific variant of the process of the invention comprises the steps of
producing a molding material mixture by mixing a molding material base with components (i), (ii) and (iii) of a binder system of the invention and optionally further constituents of the molding material mixture to be produced,
producing a molding by molding the molding material mixture and curing the binder system in the molded molding material mixture,
applying a coating composition comprising particles of one or more refractories dispersed in a carrier liquid to the molding, to form a coated molding whose surface has regions provided with the coating composition,
combining the coated molding with one or more further moldings produced by molding the aforesaid molding material mixture or another molding material mixture and curing the binder system in the molded molding material mixture, to form a combined molding,
thermally treating the combined molding at a temperature above 40° C., preferably in the range from 50° C. to 200° C., to give an article from the group consisting of foundry molds and foundry cores and combinations of a foundry mold with cores, the surface of which has regions in which a coating comprising particles of one or more refractories is disposed.

In the case of this second specific variant of the process of the invention, multiple moldings are produced which are intended for combination to form an article from the group consisting of foundry molds and foundry cores or combinations of foundry mold with one core or with two or more cores. At least one of these moldings is produced by molding a molding material mixture comprising components (i), (ii)

and (iii) of a binder system according to the above-described first aspect of the present invention, and curing the binder system in the molded molding material mixture. Applied to this molding is a coating composition comprising particles of one or more refractories dispersed in a carrier liquid, to form a coated molding whose surface has regions provided with the coating composition. The further moldings are produced using the same molding material mixture or a different molding material mixture. This different molding material mixture may comprise a binder system not in accordance with the invention. A coating composition comprising particles of one or more refractories dispersed in a carrier liquid may be applied to one, two or more or all of the further moldings, to form a coated molding whose surface has regions provided with the coating composition. Subsequently, the moldings produced, including at least one coated molding produced from a molding material mixture with a binder system of the invention, are combined to form a combined molding.

The thermal treatment of the combined molding at a temperature of above 40° C., preferably in the range from 50° C. to 200° C., removes the carrier liquid from the applied coating composition. The resultant coating, which comprises particles of one or more refractories, forms a surface of the foundry mold or foundry core that comes into contact with a metal melt during casting.

In this second specific variant of the process of the invention, as well, a coating composition is preferably employed which is as described above in the context of the first specific variant of the process of the invention, said composition comprising, dispersed in a carrier liquid, particles of one or more refractories, and also one or more compounds capable of forming nonvolatile compounds by reaction with formaldehyde, so that the emission of formaldehyde during thermal treatment for removing the carrier liquid of the coating composition is further reduced.

In the case of this second specific variant of the process of the invention, particular preference is given to producing all of the moldings that are to be combined by molding a molding material mixture comprising components (i), (ii) and (iii) of a binder system according to the above-described first aspect of the present invention, and curing the binder system in the molded molding material mixture. Preferably, therefore, a process according to the second specific variant of the process of the invention comprises the steps of
producing a molding material mixture by mixing the phenolic resin component (i) and the polyisocyanate component (ii) of a binder system according to the first aspect of the invention as described above with a molding material base and optionally further constituents of the molding material mixture to be produced,
producing two or more moldings in each case by molding the molding material mixture and curing the binder system of the molded molding material mixture,
applying a coating composition comprising particles of one or more refractories dispersed in a carrier liquid to one, two or more or all of the moldings, to form coated moldings whose surface have regions provided with the coating composition,
combining the moldings, with one, two or more or all of the moldings being coated moldings, to form a combined molding,
thermally treating the combined molding at a temperature above 40° C., preferably in the range from 50° C. to 200° C., to give an article from the group consisting of foundry molds and foundry cores and combinations of a foundry mold with cores, the surface of which has regions in which a coating comprising particles of one or more refractories is disposed.

A fourth aspect of the present invention concerns articles from the group consisting of foundry molds and foundry cores. Such articles are producible by a process according to the above-described third aspect of the present invention.

An article of this kind typically comprises a molding which comprises
a molding material base bound by a polyurethane formed by curing the binder system of the invention,
and also one or more substances e) selected from the group consisting of amino acids and urea and/or reaction products thereof with formaldehyde.

An article of this kind typically comprises a molding which comprises
a molding material base bound by a cured polyurethane formed from the phenolic resin of the phenolic resin component (i) and from the polyisocyanate of the polyisocyanate component (ii) of a binder system according to the first aspect of the invention,
and also one or more substances e) selected from the group consisting of amino acids and urea and/or one or more reaction products of one or more substances e) selected from the group consisting of amino acids and urea with formaldehyde.

In certain cases such an article comprises a molding which comprises
a molding material base bound by a polyurethane formed by curing a binder system of the invention, preferably a molding material base bound by a cured polyurethane formed from the phenolic resin of the phenolic resin component (i) and from the polyisocyanate of the polyisocyanate component (ii) of a binder system according to the first aspect of the invention,
and also one or more reaction products of one or more substances e) selected from the group consisting of amino acids and urea with formaldehyde.

The article of the invention preferably comprises a molding which comprises
a molding material base bound by a polyurethane formed by curing a binder system of the invention, preferably a molding material base bound by a cured polyurethane formed from the phenolic resin of the phenolic resin component (i) and from the polyisocyanate of the polyisocyanate component (ii) of a binder system according to the first aspect of the invention,
and also glycine and/or reaction products thereof with formaldehyde.

In a first specific embodiment, an article of the invention comprises a molding which comprises
a molding material base bound by a polyurethane formed by curing a binder system of the invention, preferably a molding material base bound by a cured polyurethane formed from the phenolic resin of the phenolic resin component (i) and from the polyisocyanate of the polyisocyanate component (ii) of a binder system according to the first aspect of the invention as described above,
and also one or more reaction products formed by reaction of one or more substances e) selected from the group consisting of amino acids and urea with formaldehyde,
where the surface of the article has regions in which a coating is disposed that comprises particles of one or more refractories.

In this first specific embodiment, an article of the invention comprises a molding which comprises a molding material base bound by a polyurethane formed by curing a binder system according to the above-described first aspect of the invention, and also one or more reaction products formed by reaction of substances e) selected from the group consisting of amino acids and urea with formaldehyde. The surface of the article has regions in which a coating is disposed that comprises particles of one or more refractories. The coating forms a surface of the foundry mold or foundry core that comes into contact with a metal melt during casting. It is not necessary here for the coating to extend over the entire surface of the article. Such coatings are commonly referred to as refractory coatings.

Articles of the invention in this first specific embodiment are producible by a process of the invention in accordance with the above-described first specific variant.

An article according to this first specific embodiment preferably comprises a molding which comprises
a molding material base bound by a polyurethane formed by curing a binder system of the invention, preferably a molding material base bound by a cured polyurethane formed from the phenolic resin of the phenolic resin component (i) and from the polyisocyanate of the polyisocyanate component (ii) of a binder system according to the first aspect of the invention,
and also one or more reaction products formed by reaction of glycine with formaldehyde, where the surface of the article has regions in which a coating is disposed that comprises particles of one or more refractories.

In a second specific embodiment, an article of the invention comprises multiple moldings combined with one another, where at least one of the moldings combined with one another comprises
a molding material base bound by a polyurethane formed by curing a binder system of the invention, preferably a molding material base bound by a cured polyurethane formed from the phenolic resin of the phenolic resin component (i) and from the polyisocyanate of the polyisocyanate component (ii) of a binder system according to the first aspect of the invention as described above,
and also one or more reaction products formed by reaction of one or more substances e) selected from the group consisting of amino acids and urea with formaldehyde,
where the surface of the article has regions in which a coating is disposed that comprises particles of one or more refractories.

In this second specific embodiment, an article of the invention comprises multiple moldings combined with one another. At least one of the moldings combined with one another comprises a molding material base bound by a polyurethane formed by curing a binder system according to the above-described first aspect of the invention, and also one or more reaction products formed by reaction of substances e) selected from the group consisting of amino acids and urea with formaldehyde. Preferably all of the moldings combined with one another comprise a molding material base bound by a polyurethane formed by curing a binder system according to the above-described first aspect of the invention, and also one or more reaction products formed by reaction of substances e) selected from the group consisting of amino acids and urea with formaldehyde. The surface of the article has regions in which a coating is disposed that comprises particles of one or more refractories. The coating forms a surface of the foundry mold or foundry core that comes into contact with a metal melt during casting. It is not necessary here for the coating to extend over the entire surface of the article. Such coatings are commonly referred to as refractory coatings.

Articles of the invention in this second specific embodiment are producible by a process of the invention in accordance with the above-described second specific variant.

An article according to this second specific embodiment preferably comprises multiple moldings combined with one another, where at least one of the moldings combined with one another comprises
a molding material base bound by a polyurethane formed by curing a binder system of the invention, preferably a molding material base bound by a cured polyurethane formed from the phenolic resin of the phenolic resin component (i) and from the polyisocyanate of the polyisocyanate component (ii) of a binder system according to the first aspect of the invention as described above,
and also one or more reaction products formed by reaction of glycine with formaldehyde,
where the surface of the article has regions in which a coating is disposed that comprises particles of one or more refractories.

In particularly preferred articles of the invention, the coating comprises reaction products formed by reaction of the formaldehyde with one or more compounds selected from the group consisting of
β-dicarbonyl compounds
di- and trihydric phenols
phenol-formaldehyde novolacs and resorcinol-formaldehyde novolacs
amino acids
primary and secondary aminosilanes
alkali metal hydrogensulfites
melamine, benzoguanamine, urea and derivatives thereof
hydrazine and carbonohydrazide and derivatives thereof
primary and secondary amines
tree resins, tannins and lignins;
in other words, in a particularly preferred article of this kind, the coating comprises the reaction products formed by reaction of formaldehyde scavengers present in the coating composition with formaldehyde formed during the thermal treatment of the coated molding.

Further aspects of the present invention relate to
the use of substances e) selected from the group consisting of amino acids and urea, especially glycine, for producing binder systems according to the above-described first aspect of the invention, and for producing molding material mixtures according to the above-described second aspect of the present invention
the use of a binder system according to the above-described first aspect of the invention for producing articles from the group consisting of foundry molds, foundry cores and feeders,
the use of a binder system according to the above-described first aspect of the invention in a process according to the above-described third aspect of the invention, where in the process of the invention the molding formed by curing the binder system in the molded molding material mixture may be subjected to further working with supply of heat,
the use of a binder system according to the above-described first aspect of the invention in a process according to the above-described third aspect of the invention, where the process of the invention may comprise a further step of working, in which there is thermal treatment of the molding formed by curing the binder system in the molded molding material mixture.
the use of substances selected from the group consisting of amino acids and urea for binding the molecular formaldehyde released from a molding on thermal exposure, by formation of nonvolatile reaction products, where the molding comprises a molding material base which is bound by a polyurethane formed by curing a binder system according to the first aspect of the invention as described above, preferably a molding material base bound by a cured polyurethane formed from the phenolic resin of the phenolic resin component (i) and from the polyisocyanate of the polyisocyanate component (ii) of a binder system according to the first aspect of the invention as described above. The molding material base preferably comprises a fraction of recycled foundry sand.

The above observations regarding the first aspect of the present invention are valid in respect of preferred substances e) selected from the group consisting of amino acids and urea.

The above observations regarding the first aspect of the present invention are valid in relation to preferred features and embodiments of the binder system.

The above observations regarding the third aspect of the present invention are valid in respect of preferred features, versions and variants of the process.

The invention is elucidated further hereinafter with working examples and comparative examples.

1. COMPOSITION OF THE BINDER SYSTEMS

The figures in % are based respectively on the total mass of the phenolic resin component (i), of the polyisocyanate component (ii) and/or of component (iii). The components are spatially separate from one another, meaning that they are present in separate containers.

Binder System I

| Phenolic resin component (i): | |
| --- | --- |
| Phenolic resin a) | ortho, ortho'-fused resole with terminal methylol groups —$CH_2OH$ and also methanol-etherified terminal methylol groups —$CH_2OCH_3$, 54.5% |
| Solvent b) | mixture of dialkyl esters of $C_4$-$C_6$ dicarboxylic acids and rapeseed oil methyl ester- |
| Isocyanate component (ii) | |
| Isocyanate: c) | polymeric MDI, 85% |
| Solvent d) | rapeseed oil methyl ester |

Binder System II

| Phenolic resin component (i): | |
| --- | --- |
| Phenolic resin a) | ortho, ortho'-fused resole with terminal methylol groups —$CH_2OH$ and also methanol-etherified terminal methylol groups —$CH_2OCH_3$, 53.5% |
| Solvent b) | mixture of dialkyl esters of $C_4$-$C_6$ dicarboxylic acids and rapeseed oil methyl ester |
| Isocyanate component (ii) | |
| Isocyanate: c) | polymeric MDI, 80% |
| Solvent d) | tetraethyl silicate |

Binder System III

| Phenolic resin component (i): | |
| --- | --- |
| Phenolic resin a) | ortho, ortho'-fused resole with terminal methylol groups —$CH_2OH$ and also methanol-etherified terminal methylol groups —$CH_2OCH_3$, 52% |
| Solvent b) | mixture of dialkyl esters of $C_4$-$C_6$ dicarboxylic acids and aromatic hydrocarbons |
| Isocyanate component (ii) | |
| Isocyanate: c) | polymeric MDI, 81% |
| Solvent d) | $C_{10}$-$C_{13}$ alkylbenzene |

The noninventive variant for each of the binder systems I, II and III consists of components (i) and (ii) as indicated above, with the components being spatially separate from one another, i.e., present in separate containers.

For binder system I, different inventive variants were tested, differing in the composition of component (iii), which was provided in a separate container in each case. The concentration of the glycine is based in each case on the total mass of component (iii).

| Component (iii) variant 1 | |
| --- | --- |
| Amino acid e) | glycine 100% |
| Component (iii) variant 2 | |
| Amino acid e) | glycine 25% |
| Further constituents f) | Sand H32 |
| Component (iii) variant 3 | |
| Amino acid e) | glycine 25% |
| Further constituents f) | wood flour, iron oxide, | mixed with a composition corresponding to phenolic resin component (i) of the binder system I as indicated above, with the solids fraction in component (iii) as per variant 3 being at least 80%, based on the total mass of component (iii) as per variant 3.

| Component (iii) variant 4a | |
| --- | --- |
| Amino acid e) | glycine 25% |
| Further constituents f) | starch, iron oxide |
| Component (iii) variant 4b | |
| Amino acid e) | glycine 50% |
| Further constituents f) | starch, iron oxide, |

The further constituents f) of variants 3, 4a and 4b of component (iii) are customary constituents of additive mixtures for molding material mixtures. Such additives are prior art, being used, for example, to prevent casting defects. For comparison, noninventive molding material mixtures were produced, substituting for component (iii) a comparative additive 3 or 4, respectively, each containing the aforesaid further constituents of variant 3 or 4a and 4b of component (iii), but no substances from the group consisting of urea and amino acids. In comparative additive 3, the further constituents of variant 3 of component (iii) are present in the same concentration ratios relative to one another as in variant 3 of component (iii). In comparative additive 4, the further constituents of variant 4a and 4b of component (iii) are present in the same concentration ratios relative to one another as in variant 4a and 4b of component (iii).

In the inventive variant of binder system II and III, respectively, component (iii) as per the above-described variant 1 was employed.

2. PRODUCTION OF TEST SPECIMENS (COLD BOX PROCESS)

Molding material mixtures comprising H32 silica sand as molding material base and also one (inventive or noninventive) variant in each case of one of the binder systems I, II and III described in section 1 were used to produce test specimens in the form of flexural bars (186 mm×22 mm×11 mm) by the cold box process.

To produce the molding material mixture, the molding material base (100 parts by mass) was charged to a mixing vessel. The phenolic resin component (i) (0.7 part by mass) and the polyisocyanate component (ii) (0.7 part by mass) of the respective binder system and, where appropriate, component (iii) (for parts by mass see tables below), or a comparative additive as described above, were then weighed out into the mixing vessel in such a way as to avoid direct mixing of the ingredients. The molding material base, phenolic resin component (i), polyisocyanate component (ii), and, where appropriate, component (iii) (for parts by mass see tables below), or comparative additive, were mixed in a bull mixer for 120 seconds at level 4 to give a molding material mixture.

The molding material mixture was molded using a Multiserw core shooting machine at a shooting pressure of 4 bar (400 kPa). To cure the binder system in the molded molding material mixture, the mixture was gassed for 10 seconds with dimethylpropyl amine (in a carrier gas stream) at a temperature in the range from 20 to 30° C. with a gassing pressure of 2 bar (200 kPa) by means of a Titronic 110 Plus gassing device.

3. MEASUREMENT OF FORMALDEHYDE EMISSIONS ON THERMAL TREATMENT

Selected test specimens without a coating based on a refractory coating were exposed to a temperature of 177° C. in a tubular oven. One minute after the test specimens had been introduced into the oven heated to 177° C., measurement of the concentration of formaldehyde in the oven air was commenced. For this purpose, air is withdrawn from the tubular oven through an LpDNPH cartridge (LpDNPH Cartridge S10 volume 3 mL from Supelco) at a volume flow rate of 1.5 L/min, using a Xact 5000 pump (from Drager) for 10 minutes. The cartridge was analyzed by HPLC according to DIN 16000-3. The results of the measurements are collated in tables 1 to 3 below.

4. MEASUREMENTS OF FLEXURAL STRENGTH

To ensure that the addition of glycine to the molding material mixture has no adverse effect on the strength of moldings produced with the binder systems I to III, flexural strengths were ascertained for the test specimens produced with different variants of the binder systems I to III, as a function of various parameters (time after the end of curing, storage time of the molding material mixture prior to molding, storage conditions of the test specimens produced, coating based on a refractory coating). Each determination was made on a separately produced test specimen. The results of the measurements are collated in tables 1 and 2 below. The terms in these tables have the following meanings:

B-1h: Test specimen dipped in refractory coating composition immediately after curing, stored at room temperature in a digester, tested after 1 hour.

B-24h: Test specimen dipped in refractory coating composition immediately after curing, stored at room temperature in a digester, tested after 24 hours.

B-72h: Test specimen dipped in refractory coating composition immediately after curing, stored at room temperature in a digester, tested after 72 hours.

D-1 h: Test specimen dipped in refractory coating composition immediately after curing, dried in the oven at 150° C. for 1 hour, tested after cooling to room temperature.

The refractory coating composition comprises in each case water as carrier liquid and particles of aluminum silicate as refractory.

F-24h: Test specimen stored immediately after curing at 100% relative humidity at room temperature for 24 hours and tested immediately on removal from storage.

F-72h: Test specimen stored immediately after curing at 100% relative humidity at room temperature for 72 hours and tested immediately on removal from storage.

5. SUMMARY OF RESULTS

In the binder systems tested, a reduction in formaldehyde emissions of around 20 to 50% was achieved, with sufficient flexural strengths, using glycine as amino acid e) in component (iii). The amount of amino acid e) added is preferably 0.1 to 3 parts by mass, more preferably 0.25 to 2 parts by mass, based on 100 parts by mass of molding material base (see table 1).

As far as the reduction in formaldehyde emissions is concerned, it makes no substantial difference whether the amino acid e) has been added in pure form (variant 1), or as part of a mixture with a molding material base (variant 2), or as part of a mixture with constituents of typical additive mixtures for molding material mixtures (variants 3, 4a, 4b), see table 3. The addition of the amino acid e) as part of a mixture with one or more further constituents f), which are present in any case in the desired molding material mixture (e.g., the respective molding material base, or the respective phenolic resin component), or which are typically added to the desired molding material mixture (e.g., additive mixtures for preventing casting defects), has practical advantages, as the addition and metering of the amino acid e) is facilitated.

6. FURTHER EXAMPLES

In-house investigations showed that other amino acids, particularly from the group consisting of glutamine, alanine, valine and serine, and also urea, have a similar effect in the reduction of formaldehyde emissions.

TABLE 1

Test results for binder system I without component (iii) and, respectively, with component (iii) as per variant 1

| Glycine concentration in molding material mixture [parts by mass] | 0 | 0.1 | 0.5 | 1.0 | 2.0 | 3.0 |
|---|---|---|---|---|---|---|
| Concentration of formaldehyde [mg/m³] in oven air after 10 minutes | 6.0 | 4.6 | 4.0 | 3.6 | 3.1 | 3.3 |

TABLE 1-continued

Test results for binder system I without component (iii) and, respectively, with component (iii) as per variant 1

| Reduction [%] in formaldehyde concentration relative to noninventive variant without glycine | — | 23 | 33 | 40 | 48 | 45 |
|---|---|---|---|---|---|---|
| Flexural strengths [N/cm²] | | | | | | |
| no storage of molding material mixture prior to molding | | | | | | |
| 15 s after end of curing | 210 | 200 | 200 | 200 | 190 | 190 |
| 1 h after end of curing | 350 | 360 | 350 | 350 | 350 | 330 |
| 24 h after end of curing | 410 | 410 | 400 | 400 | 390 | 380 |
| 1 h storage of molding material mixture prior to molding | | | | | | |
| 15 s after end of curing | 200 | 200 | 190 | 190 | 190 | 190 |
| 1 h after end of curing | 350 | 350 | 330 | 340 | 330 | 320 |
| 24 h after end of curing | 400 | 390 | 380 | 380 | 370 | 360 |
| 2 h storage of molding material mixture prior to molding | | | | | | |
| 15 s after end of curing | 190 | 190 | 190 | 190 | 190 | 180 |
| 1 h after end of curing | 340 | 340 | 320 | 320 | 330 | 310 |
| 24 h after end of curing | 390 | 370 | 370 | 360 | 360 | 340 |
| Test specimens with coating based on a refractory coating | | | | | | |
| B - 1 h | 330 | 330 | 310 | 290 | 280 | 260 |
| B - 24 h | 430 | 440 | 420 | 420 | 400 | 350 |
| D - 1 h | 530 | 540 | 520 | 490 | 510 | 490 |
| Storage at 100% humidity | | | | | | |
| F - 24 h | 360 | 350 | 340 | 320 | 290 | 270 |

TABLE 2

Test results for binder systems I (different test specimens from table 1), II and III without component (iii) and, respectively, with component (iii) as per variant 1

| Binder system | I | | II | | III | |
|---|---|---|---|---|---|---|
| Glycine concentration in molding material mixture [parts by mass] | 0 | 1.0 | 0 | 1.0 | 0 | 1.0 |
| Concentration of formaldehyde [mg/m³] in oven air after 10 minutes | 6.0 | 3.6 | 6.5 | 4.9 | 6.0 | 2.9 |
| Reduction [%] in formaldehyde concentration relative to noninventive variant without glycine | — | 40 | — | 25 | — | 38 |
| Flexural strengths [N/cm²] | | | | | | |
| no storage of molding material mixture prior to molding | | | | | | |
| 15 s after end of curing | 210 | 200 | 270 | 270 | 250 | 240 |
| 1 h after end of curing | 350 | 350 | 410 | 390 | 460 | 440 |
| 24 h after end of curing | 410 | 400 | 450 | 420 | 520 | 490 |
| 1 h storage of molding material mixture prior to molding | | | | | | |
| 15 s after end of curing | 200 | 190 | 270 | 260 | 240 | 240 |
| 1 h after end of curing | 350 | 340 | 410 | 380 | 470 | 450 |
| 24 h after end of curing | 400 | 380 | 460 | 440 | 510 | 500 |
| 2 h storage of molding material mixture prior to molding | | | | | | |
| 15 s after end of curing | 190 | 190 | 260 | 240 | 240 | 240 |
| 1 h after end of curing | 340 | 320 | 380 | 370 | 450 | 450 |
| 24 h after end of curing | 390 | 360 | 420 | 410 | 490 | 470 |
| Test specimens with coating based on a refractory coating | | | | | | |
| B - 1 h | 330 | 290 | 290 | 270 | 410 | 370 |
| B - 24 h | 430 | 420 | 440 | 430 | 480 | 460 |
| D - 1 h | 530 | 490 | 510 | 540 | 610 | 570 |
| Storage at 100% humidity | | | | | | |
| F - 24 h | 360 | 320 | 380 | 350 | 430 | 390 |

TABLE 3

Formaldehyde emissions of test specimens produced with binder system I, with different variants of component (iii)

| Component (iii) or comparative additive | Amount of component (iii) or comparative additive used [parts by mass] | Glycine concentration in molding material mixture [parts by mass] | Formaldehyde concentration [mg/m³] in oven air after 10 minutes |
|---|---|---|---|
| — | — | 0 | 6.0 |
| Variant 1 | 0.5 | 0.5 | 4.0 |
| Variant 2 | 2 | 0.5 | 4.2 |
| Variant 3 | 2 | 0.5 | 3.9 |
| Comparative additive 3 | 2 | 0 | 6.1 |
| Variant 4a | 1 | 0.25 | 4.9 |
| Variant 4b | 1 | 0.5 | 4.4 |
| Comparative additive 4 | 1 | 0 | — |

We claim:

1. A binder system comprising
   (i) a phenolic resin component comprising
      a) one or more phenolic resins
      b) a solvent selected from the group consisting of
         dialkyl esters of $C_4$-$C_6$ dicarboxylic acids,
         saturated and unsaturated fatty acid alkyl esters,
         alkylene carbonates,
         substances from the group consisting of cashew nut shell oil, components of cashew nut shell oil and derivatives of cashew nut shell oil,
         liquid hydrocarbons,
         compounds from the group of the alkylsilanes, alkyl/alkoxysilanes, alkoxysilanes, alkylsiloxanes, alkyl/alkoxysiloxanes and alkoxysiloxanes of the formula (I)

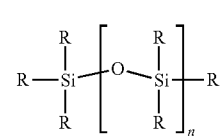

(I)

where n is an integer from 0 to 20, and
each R independently of the other Rs is selected from the group of the alkyl groups having one to 6 carbon atoms and alkoxy groups having one to 6 carbon atoms
and mixtures thereof
where based on the total mass of the phenolic resin component (i), the concentration of the phenolic resins a) is 40% to 60%
   (ii) a polyisocyanate component comprising
      c) one or more isocyanates having at least two isocyanate groups per molecule where based on the total mass of the polyisocyanate component (ii), the concentration of the isocyanates c) is 60% to 100%
   (iii) a further component comprising
      e) one or more substances selected from the group consisting of amino acids and urea
where based on the total mass of component (iii), the total concentration of the substances e) selected from the group consisting of amino acids and urea is 0.1% to 100%,
where components (i), (ii) and (iii) are spatially separate from one another.

2. The binder system as claimed in claim 1, wherein the amino acids e) are selected from the group consisting of alanine, glycine, isoleucine, methionine, proline, valine, histidine, phenylalanine, tryptophan, tyrosine, asparagine, glutamine, cysteine, methionine, serine, threonine, tyrosine, lysine, arginine and histidine.

3. The binder system as claimed in claim 1, wherein, in the phenolic resin component (i)
   a) the phenolic resin is an ortho,ortho'-fused resole containing
      unetherified terminal methylol groups
      and/or
      etherified terminal methylol groups.

4. The binder system as claimed in claim 1, wherein the phenolic resin component (i) further comprises
   g) molecular formaldehyde in a concentration of less than 0.1%,
   and/or
   h) one or more β-dicarbonyl compounds and reaction products formed by reacting these β-dicarbonyl compounds with formaldehyde
   and/or
   i) monomeric compounds from the group of the phenols in a concentration of 10% or less,
   where the concentrations are based in each case on the total mass of the phenolic resin component (i).

5. The binder system as claimed in claim 1, wherein
   in the polyisocyanate component (ii)
   c) the isocyanates having at least two isocyanate groups per molecule are selected from the group consisting of
      methylenebis(phenyl isocyanates),
      polymethylene polyphenyl isocyanates,
      aliphatic isocyanates,
      cycloaliphatic isocyanates,
      isocyanates having at least two isocyanate groups and one carbodiimide group per molecule,
      isocyanates having at least two isocyanate groups and urethonimine group per molecule,
   and/or the polyisocyanate component (ii) additionally comprises
   d) a solvent,
      where the solvent is preferably selected from the group consisting of
      dialkyl esters of $C_4$-$C_6$ dicarboxylic acids,
      saturated and unsaturated fatty acid alkyl esters,
      alkylene carbonates,
      liquid hydrocarbons
      compounds from the group of the alkylsilanes, alkyl/alkoxysilanes, alkoxysilanes, alkylsiloxanes, alkyl/alkoxysiloxanes and alkoxysiloxanes of the formula (I)

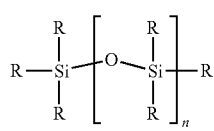

(I)

where n is an integer from 0 to 20, and
each R, independently of the other Rs, is selected from the group of the alkyl groups having one to 6 carbon atoms and the alkoxy groups having one to 6 carbon atoms
and mixtures thereof and/or
the polyisocyanate component (ii) additionally comprises
m) one or more β-dicarbonyl compounds, where based on the total mass of the polyisocyanate component, the concentration of β-dicarbonyl compounds) is 1% to 38%.

6. A process for producing a molding, wherein the process comprises the steps of:
   producing a molding material mixture by mixing a molding material base with components (i), (ii) and (iii) of a binder system as claimed in claim 1,
   molding the molding material mixture,
   curing the binder system in the molded molding material mixture, to form a molding.

7. The process as claimed in claim 6, wherein the molding material mixture is produced by
   metering components (i) and (ii) of the binder system such that the total concentration of components (i) and (ii) of the binder system is 0.6% to 14%, based on the total mass of the molding material mixture,
   and/or
   metering components (i) and (ii) of the binder system such that the stoichiometric ratio of isocyanate groups in the isocyanates c) to hydroxyl groups in the phenolic resins a) is in the range from 0.5 to 1.5,
   and/or
   metering component (iii) of the binder system such that the total amount of substances e) selected from the group consisting of amino acids and urea is 0.1% to 5.0%, based on the total mass of the molding material mixture.

8. The process as claimed in claim 6, wherein
   the concentration of the substances e) introduced into the molding material mixture with component (iii), selected from the group consisting of amino acids and urea, is set such that there is a molar excess relative to the amount of molecular formaldehyde g) introduced into the molding material mixture with the phenolic resin component (i).

9. The process as claimed in claim 6, wherein the binder system is cured in the molded molding material mixture by contacting the molded molding material mixture with
   a gaseous tertiary amine or with a mixture of two or more gaseous tertiary amines
   or
   with a liquid amine or with a mixture of two or more liquid amines.

10. The process as claimed in claim 6, comprising the steps of
    producing the molding material mixture by mixing a molding material base with components (i), (ii) and (iii) of the binder system, molding the molding material mixture, and curing the binder system in the molded molding material mixture, to give a molding,
    applying a coating composition comprising particles of one or more refractories, dispersed in a carrier liquid, to the molding, to form a coated molding whose surface has regions provided with the coating composition,
    thermally treating the coated molding at a temperature in the range from 50° to 200° C., forming an article from the group consisting of foundry molds and foundry cores, the surface of which has regions in which a coating comprising particles of one or more refractories is disposed.

* * * * *